(12) United States Patent
Yano

(10) Patent No.: US 10,026,005 B2
(45) Date of Patent: Jul. 17, 2018

(54) COLOR-SCHEME EVALUATION DEVICE, COLOR-SCHEME EVALUATION METHOD, AND STORAGE MEDIUM ON WHICH COLOR-SCHEME EVALUATION PROGRAM IS STORED

(71) Applicant: NEC Corporation, Tokyo (JP)

(72) Inventor: Naomi Yano, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/129,224

(22) PCT Filed: Mar. 18, 2015

(86) PCT No.: PCT/JP2015/001523
§ 371 (c)(1),
(2) Date: Sep. 26, 2016

(87) PCT Pub. No.: WO2015/146085
PCT Pub. Date: Oct. 1, 2015

(65) Prior Publication Data
US 2017/0109597 A1 Apr. 20, 2017

(30) Foreign Application Priority Data
Mar. 28, 2014 (JP) .................................. 2014-067525

(51) Int. Cl.
*G06K 9/46* (2006.01)
*G06K 9/62* (2006.01)

(52) U.S. Cl.
CPC ......... *G06K 9/4652* (2013.01); *G06K 9/6267* (2013.01)

(58) Field of Classification Search
CPC .......................... G06K 9/4652; G06K 9/6267
See application file for complete search history.

(56) References Cited

U.S. PATENT DOCUMENTS

2010/0158412 A1* 6/2010 Wang ................. G06K 9/00624
382/305
2010/0182619 A1* 7/2010 Kim ..................... H04N 1/6072
358/1.9
(Continued)

FOREIGN PATENT DOCUMENTS

JP H08-241191 A 9/1996
JP H08-272438 A 10/1996
(Continued)

OTHER PUBLICATIONS

International Search Report corresponding to PCT/JP2015/001523, dated Jun. 2, 2015, 1 page.
(Continued)

*Primary Examiner* — Ming Hon
(74) *Attorney, Agent, or Firm* — Wilmer Cutler Pickering Hale and Dorr LLP

(57) ABSTRACT

Provided is a color scheme evaluation apparatus including a color range storage unit and a color scheme evaluation unit. The color range storage unit configured to store information about a color range of a color scheme for an evaluation target object constituting an evaluation target screen. The color scheme evaluation unit configured to create an evaluation criterion usable for evaluating a color scheme for the evaluation target object, by interpreting a relationship of a group into which the evaluation target object is classified, on the basis of evaluation target object information including information about the color scheme for the evaluation target object and information about the group, and group relationship information including the relationship about the group, and to evaluate the color scheme for the evaluation target object on the basis of the evaluation criterion by referring to the information about the color range.

7 Claims, 18 Drawing Sheets

(56) References Cited

U.S. PATENT DOCUMENTS

| | | | | |
|---|---|---|---|---|
| 2011/0167303 A1* | 7/2011 | Ikegami | ............ | G06F 11/3672 |
| | | | | 714/38.1 |
| 2013/0088613 A1* | 4/2013 | Kanto | .................. | H04N 9/045 |
| | | | | 348/223.1 |
| 2013/0259383 A1* | 10/2013 | Kondo | .................... | G06K 9/46 |
| | | | | 382/199 |
| 2015/0002530 A1* | 1/2015 | Yokomizo | .............. | H04N 1/46 |
| | | | | 345/589 |
| 2015/0043812 A1* | 2/2015 | Yano | .................. | G06K 9/4652 |
| | | | | 382/164 |
| 2016/0078225 A1* | 3/2016 | Ray | .................... | G06F 21/554 |
| | | | | 726/23 |

FOREIGN PATENT DOCUMENTS

| | | |
|---|---|---|
| JP | H11-85497 A | 3/1999 |
| JP | 2002-197403 A | 7/2002 |
| JP | 2010-128533 A | 6/2010 |
| WO | WO-2010/035390 A1 | 4/2010 |

OTHER PUBLICATIONS

Written Opinion of the International Search Authority of PCT/JP2015/001523 with English translation, dated Jun. 2, 2015, 4 page.

* cited by examiner

Fig. 3

| WORK (GROUP) 301a | SCREEN (GROUP) 301b | COMPONENT (EVALUATION TARGET OBJECT) 301c | COLOR VALUE 301d | COLOR NAME 301e |
|---|---|---|---|---|
| WORK 1 | SCREEN 1 | SCREEN ELEMENT 1 | 160, 0.50, 0.75 | BLUE |
| | | SCREEN ELEMENT 2 | 165, 0.50, 0.30 | BLUE |
| | | SCREEN ELEMENT 3 | 161, 0.42, 0.61 | BLUE |
| | SCREEN 2 | SCREEN ELEMENT 4 | | BLUE |
| | | SCREEN ELEMENT 5 | | BLUE |
| | | SCREEN ELEMENT 6 | | BLUE |
| WORK 2 | SCREEN 3 | SCREEN ELEMENT 7 | | BLUE |
| | | SCREEN ELEMENT 8 | | BLUE |
| | | SCREEN ELEMENT 9 | | BLUE |
| | SCREEN 4 | SCREEN ELEMENT 10 | | BLUE |
| | | SCREEN ELEMENT 11 | | ORANGE |
| | | SCREEN ELEMENT 12 | | ORANGE |
| | | SCREEN ELEMENT 13 | | ORANGE |
| WORK 3 | SCREEN 5 | SCREEN ELEMENT 14 | | BLUE |
| | | SCREEN ELEMENT 15 | | RED |
| | | SCREEN ELEMENT 16 | | BLUE |

Fig. 5

| GROUP INTO WHICH EVALUATION TARGET OBJECT IS CLASSIFIED | RELATIONSHIP BETWEEN GROUPS (RELATIONSHIP BETWEEN EVALUATION TARGET OBJECTS) |
|---|---|
| DIFFERENT WORK | FAR |
| SAME WORK | CLOSE |
| DIFFERENT SCREEN | CLOSE IN A CASE WHERE EVALUATION TARGET OBJECT BELONGS TO SAME WORK<br>FAR IN A CASE WHERE EVALUATION TARGET OBJECT BELONGS TO DIFFERENT WORK |
| SAME SCREEN | CLOSE |

Fig. 9

| BORDER OF COLORS | COLOR DIFFERENCE VALUE KEPT AT BORDER |
|---|---|
| ORANGE AND YELLOW | 10 |
| YELLOW AND GREEN | 30 |
| GREEN AND BLUE | 40 |
| BLUE AND PURPLE | ... |
| ... | ... |

Fig. 10

| WORK (GROUP) 1001a | SCREEN (GROUP) 1001b | COMPONENT (EVALUATION TARGET OBJECT) 1001c | COLOR VALUE 1001d | COLOR NAME 1001e |
|---|---|---|---|---|
| WORK 1 | SCREEN 1 | SCREEN ELEMENT 1 | 160, 0.50, 0.75 | BLUE |
| | | SCREEN ELEMENT 2 | 165, 0.50, 0.30 | BLUE |
| | | SCREEN ELEMENT 3 | 161, 0.42, 0.61 | BLUE |
| | | SCREEN ELEMENT 4 | | BLUE |
| | SCREEN 2 | SCREEN ELEMENT 5 | | BLUE |
| | | SCREEN ELEMENT 6 | | BLUE |
| | | SCREEN ELEMENT 7 | | BLUE |
| WORK 2 | SCREEN 3 | SCREEN ELEMENT 8 | | GREEN |
| | | SCREEN ELEMENT 9 | | GREEN |
| | | SCREEN ELEMENT 10 | | GREEN |
| | SCREEN 4 | SCREEN ELEMENT 11 | | GREEN |
| | | SCREEN ELEMENT 12 | 100, 0.61, 0.62 | GREEN |
| | | SCREEN ELEMENT 13 | 140, 0.45, 0.45 | GREEN |

1001

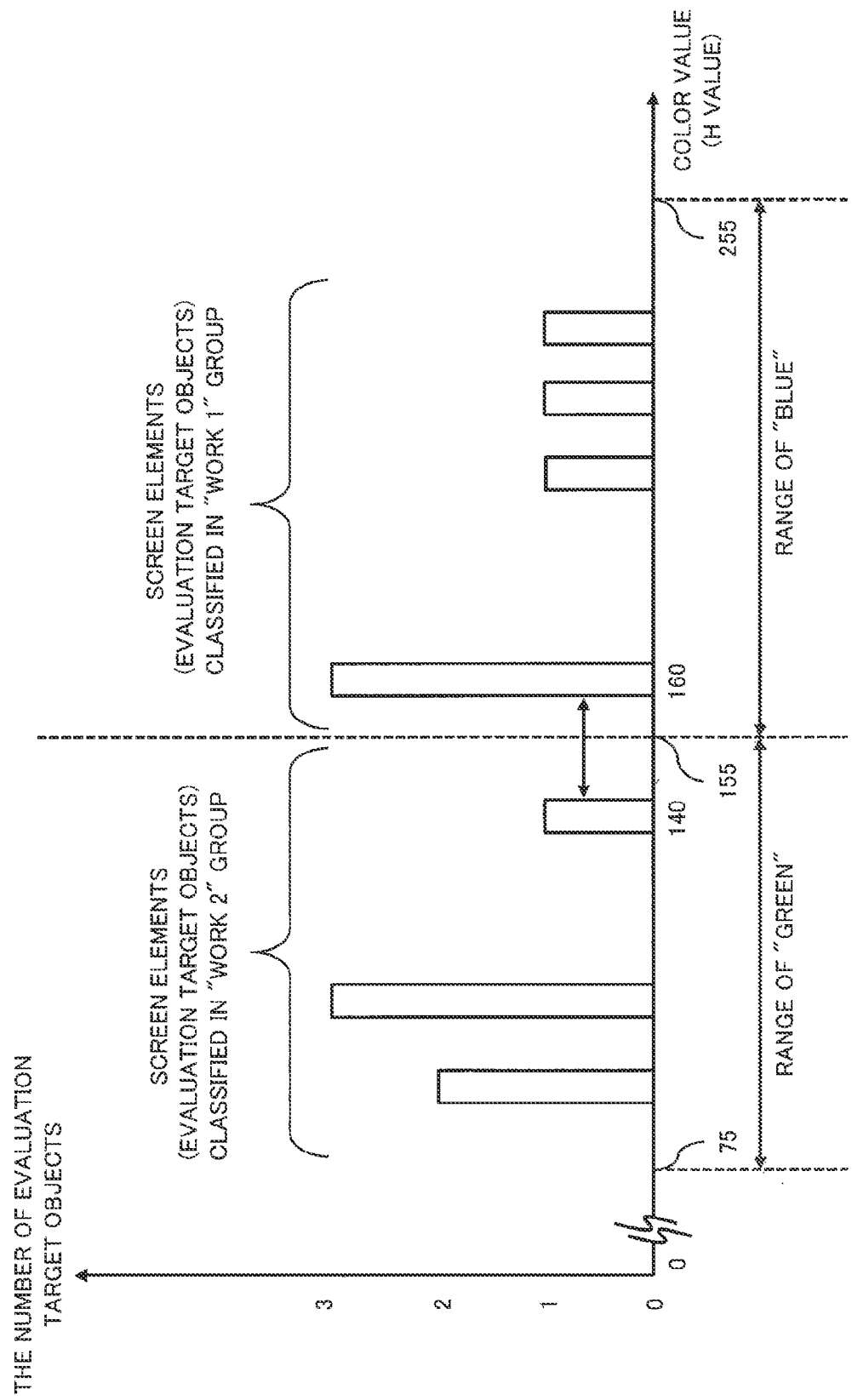

Fig. 15

| GROUP INTO WHICH EVALUATION TARGET OBJECT IS CLASSIFIED | RELATIONSHIP BETWEEN GROUPS (RELATIONSHIP BETWEEN EVALUATION TARGET OBJECTS) |
|---|---|
| DIFFERENT WORK | EXTREMELY FAR |
| SAME WORK | CLOSE |
| DIFFERENT SCREEN | CLOSE IN A CASE WHERE EVALUATION TARGET OBJECT BELONGS TO SAME WORK<br>EXTREMELY FAR IN A CASE WHERE EVALUATION TARGET OBJECT BELONGS TO DIFFERENT WORK |
| SAME SCREEN | CLOSE |

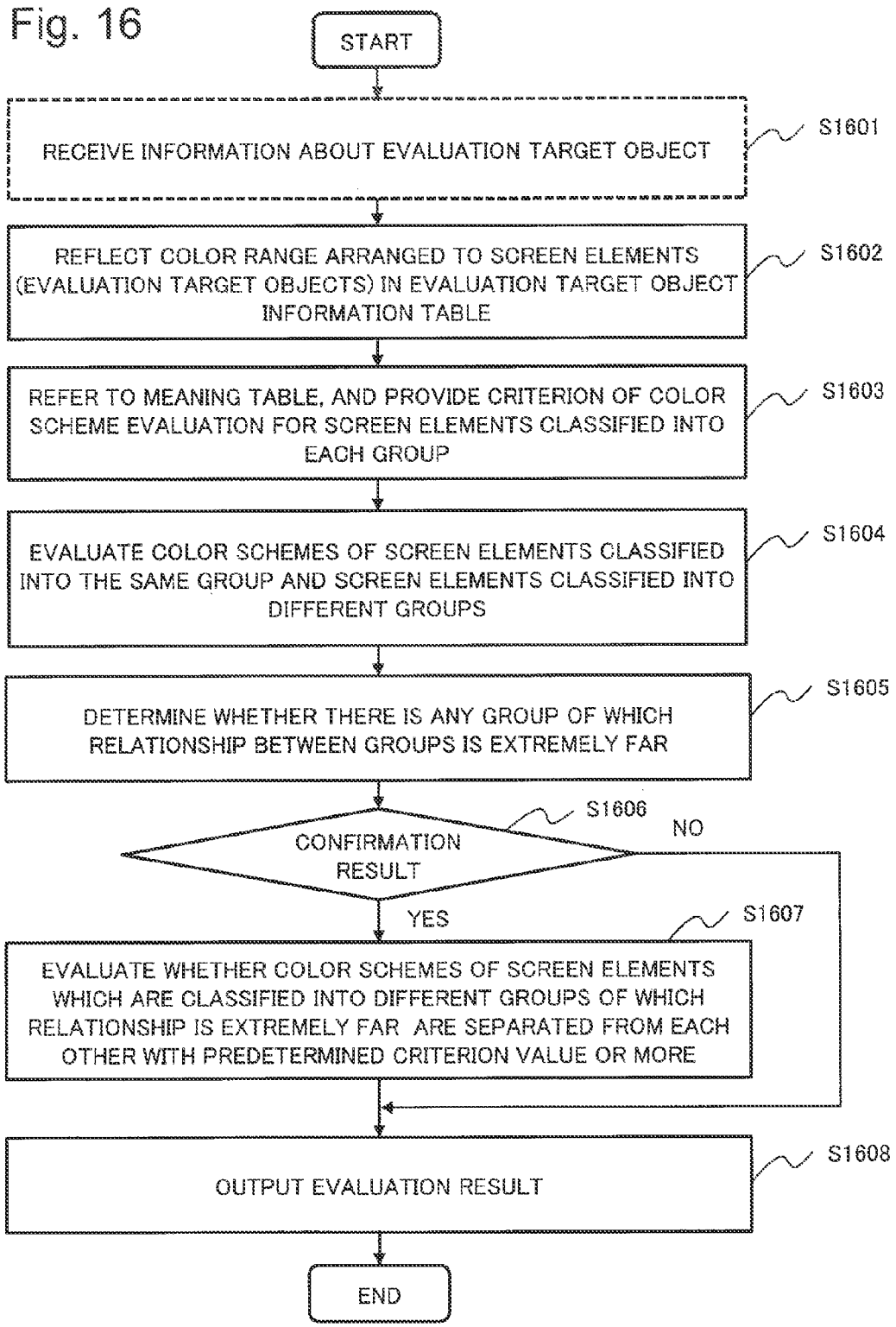

COLOR-SCHEME EVALUATION DEVICE, COLOR-SCHEME EVALUATION METHOD, AND STORAGE MEDIUM ON WHICH COLOR-SCHEME EVALUATION PROGRAM IS STORED

CROSS-REFERENCE TO RELATED APPLICATIONS

This application is a national stage application of International Application No. PCT/JP2015/001523 entitled "COLOR-SCHEME EVALUATION DEVICE, COLOR-SCHEME EVALUATION METHOD, AND STORAGE MEDIUM ON WHICH COLOR-SCHEME EVALUATION PROGRAM IS STORED," filed on Mar. 18, 2015, which claims the benefit of the priority of Japanese Patent Application No. 2014-067525 filed on Mar. 28, 2014, the disclosures of each of which are hereby incorporated by reference in their entirety.

TECHNICAL FIELD

The present invention relates to a color scheme evaluation apparatus and the like evaluating a color scheme for an element constituting a user interface.

BACKGROUND ART

In recent years, a system which presents various kinds of information and operation means to a user via a screen as a user interface (man-machine interface), and receives operation from a user, is used in general.

A screen configuration of such system can be an important factor which affects the usability of the system. Therefore, with regard to the component of the screen, it may be desirable to evaluate, for example, consistency (uniformity) of displayed appearance, validity of a display content, and the like of the components, on the basis of a particular criterion and the like. In this case, a screen of the system and a color scheme of a component of the screen could also be an important evaluation target.

As to such system screen, for example, the color scheme of the component constituting the screen is preferably arranged, so that the user can easily distinguish the types of the various kinds of functions (interfaces) displayed on the screen and the meaning of information displayed on the screen. In this case, for example, the same or similar color may be arranged to information having the same meaning, or to components presenting (providing) the same type of functions. Thereby, the color schemes of the components have consistency. On the other hand, colors of which color difference is large (different colors) may be arranged to information having different meanings or components presenting different functions.

As described above, when the difference in displayed information and the functions can be easily distinguished from each other on the basis of the color schemes of the components of the screen, the user can easily understand the rules of arrangement of colors. Thereby, the usability of the system for the user may be improved.

For example, technologies related to the consistency and the color schemes of the user interface described above are disclosed in following patent literatures (PTLs).

PTL 1 discloses technologies related to an evaluation system of a GUI (Graphical User Interface) screen. In the technology described in PTL 1, the titles are grouped on the basis of expression information (structures, colors, fonts, lines, and the like) and position information about the titles included in a screen of the evaluation target. Further, in the technology described in PTL 1, the consistency of the title expressions is evaluated by determining the sameness of the grouped titles, with regard to the all of multiple screens included in the evaluation target.

PTL 2 discloses a technology related to an evaluation method for evaluating components constituting a GUI screen. In the technology described in PTL 2, components constituting the GUI screen are grouped on the basis of attribute values (size and color) of the components. In the technology described in PTL 2, the number of components included in certain group is assumed as an inter-group distance, and the groups are integrated in the ascending order of the distance, so that a cluster is generated. In the technology described in PTL 2, consistency of the attribute values of the components are evaluated by determining that an attribute value of a component included in a cluster including a group having a largest number of components is correct, and an attribute value of a component included in the other clusters are incorrect.

PTL 3 discloses a technology of a GUI evaluation apparatus. In the technology described in PTL 3, it is determined whether the GUI of the application is designed in accordance with a guideline. In the technology described in PTL 3, the guideline of the GUI design screen is accumulated as a formality rule. Then, in the technology described in PTL 3, it is determined whether the GUI is made in accordance with the guideline or not by comparing data of objects constituting the GUI and the rule.

PTL 4 discloses a technology for a color scheme inspection of an electronic content (electronic document and the like). In the technology described in PTL 4, components (components) constituting an electronic content are extracted, and a combination pattern of components arranged in area located proximity is identified, among the components. In the technology described in PTL 4, with regard to the combination pattern, it is determined whether the color schemes of the adjacent components are compatible, on the basis of a rule.

PTL 5 discloses a technology of readability evaluation of Web content (electronic content). In the technology described in PTL 5, information about color schemes and images are extracted from Web contents. Then, in the technology described in PTL 5, multiple index values about the readability of the contents are calculated on the basis of the information. In the technology described in PTL 5, the brightness, color phase, and chroma saturation are adopted as the index values, and the index is calculated for each component of the Web content. Accordingly, in the technology described in PTL 5, the readability of the Web content is evaluated in a multiple cases (for example, a case of monochrome print, a case of color perception disabled person, and the like).

CITATION LIST

Patent Literature

[PTL1]: International Publication No. 2010/035390
[PTL2]: Japanese Patent Laid-Open No. 1999(H11)-085497
[PTL3]: Japanese Patent Laid-Open No. 1996(H8)-241191
[PTL4]: Japanese Patent Laid-Open No. 2010-128533
[PTL5]: Japanese Patent Laid-Open No. 2002-197403

SUMMARY OF INVENTION

Technical Problem

As described above, it may be desirable to be able to evaluate whether the color schemes for the components on the system screen are acceptable or not, so that the user can easily distinguish the types of various kinds of functions displayed on the screen and the meaning of information displayed.

In contrast, the evaluation technologies of GUI components described in PTL 1 and PTL 2, are technologies for simply evaluating the consistency between components on the basis of whether an attribute value (size, position, color scheme) of each component is unified or not. More specifically, in this technology, criteria that the same constituent elements (components) have the same attribute value, is adopted as a determination criterion of consistency, and therefore, the meanings, the functions, and the like of information displayed on the screen in which the constituent components are arranged are not considered.

The technology described in PTL 3 is a technology for simply evaluating a matching between a rule and a GUI configuration. That is, the technology described in PTL 3 is a technology, for example, for evaluating the color schemes of the components of the GUI on the basis of whether the color schemes are compatible with the rule or not.

The technology described in PTL 4 and PTL 5 is a technology for only evaluating the color schemes between the components constituting the particular electronic content on the basis of the arrangement and the structure of the components. Therefore, in the technology described in PTL 4 and PTL 5, the functions and the meanings of the components are not considered when the color schemes are evaluated.

As described above, in any of the related technologies existing before the filing of the present application, only the consistency and the like of the attributes, such as the color schemes, of the evaluation target objects is evaluated, on the basis of the arrangement and the configuration of the evaluation target objects arranged in the evaluation target screen. In this case, the evaluation target screen is, for example, a GUI screen and an electronic content. The evaluation target object constituting the evaluation screen is, for example, a GUI component and a component of an electronic content. Therefore, in the evaluation of the color schemes for the evaluation target objects and the like, the meaning and the function of the evaluation target object are not sufficiently considered.

Therefore, a main object of the present invention is to provide a color scheme evaluation apparatus and the like capable of evaluating whether a color is appropriately arranged to an evaluation target object constituting an evaluation target screen. In this case, the evaluation target screen may be, for example, a system screen and the like. The color scheme evaluation apparatus and the like can evaluate whether a color is appropriately arranged to an evaluation target object by considering, for example, the meaning of the information displayed by the evaluation target object, the type of the function presented by the evaluation target object, and the like.

Solution to Problem

To achieve the object, a color scheme evaluation apparatus according to one aspect of the present invention includes following configurations. The is, the color scheme evaluation apparatus includes: color range storage unit that is configured to store information about a color range of a color scheme for an evaluation target object constituting an evaluation target screen; and color scheme evaluation unit that is configured to evaluate an evaluation criterion usable for evaluating a color scheme for the evaluation target object, by interpreting a relationship of a group into which the evaluation target object is classified, on the basis of evaluation target object information including information about the color scheme for the evaluation target object and one or more pieces of information about the group into which the evaluation target object is classified in accordance with a particular criterion, and group relationship information including the relationship about the group, and for evaluating the color scheme for the evaluation target object on the basis of the evaluation criterion by referring to the information about the color range.

A color scheme evaluation method according to one aspect of the present invention includes following configurations. That is, the color scheme evaluation method includes: storing information about a color range applied to an evaluation target object constituting an evaluation target screen; creating an evaluation criterion usable for evaluating a color scheme for the evaluation target object, by interpreting a relationship of a group into which the evaluation target object is classified, on the basis of evaluation target object information including information about the color scheme for the evaluation target object and one or more pieces of information about the group into which the evaluation target object is classified in accordance with a particular criterion, and group relationship information including the relationship about the group; and evaluating the color scheme for the evaluation target object on the basis of the evaluation criterion by referring to the information about the color range.

A color scheme evaluation program according to one aspect of the present invention includes following configurations. That is, the color scheme evaluation program causes a computer to execute: processing for storing information about a color range applied to an evaluation target object constituting an evaluation target screen; processing for creating an evaluation criterion usable for evaluating a color scheme for the evaluation target object, by interpreting a relationship of a group into which the evaluation target object is classified, on the basis of evaluation target object information including information about the color scheme for the evaluation target object and one or more pieces of information about the group into which the evaluation target object is classified in accordance with a particular criterion, and group relationship information including the relationship about the group; and processing for evaluating the color scheme for the evaluation target object on the basis of the evaluation criterion by referring to the information about the color range.

It should be noted that an object of the present invention can also be realized with a computer-readable storage medium storing (recording) the color scheme evaluation program.

Advantageous Effects of Invention

According to the present invention, an evaluation can be performed to determine whether a color is appropriately arranged to an evaluation target object constituting an evaluation target screen such as a system screen and the like. According to the present invention, for example, an evaluation can be performed to determine whether a color is appropriately arranged to an evaluation target object by considering a structure of the evaluation target object, the meaning of the information displayed by the evaluation target object, the type of the function presented by the evaluation target object, and the like.

BRIEF DESCRIPTION OF DRAWINGS

FIG. 3 is a figure illustrating an example of a table representing information about an evaluation target object in the first exemplary embodiment of the present invention.

FIG. 5 is a figure illustrating an example of a table representing the group into which an evaluation target object is classified, and a relationship between evaluation target objects classified into the group, according to the first exemplary embodiment of the present invention.

FIG. 9 is a figure illustrating an example of a table representing a correspondence between a border of particular color ranges and a value of a color difference to be kept at the border of the color range, according to a second exemplary embodiment of the present invention.

FIG. 10 is a figure illustrating an example of a table representing information about evaluation target objects, according to the second exemplary embodiment of the present invention.

FIG. 11 is a figure illustrating an example of a color difference which is to be kept at a border of adjacent color ranges by a color arranged to an evaluation target object being classified into each group, according to the second exemplary embodiment of the present invention.

FIG. 15 is a figure illustrating an example of a table representing the group into which an evaluation target object is classified, and a relationship between evaluation target objects classified into the group, according to the third exemplary embodiment of the present invention.

FIG. 16 is a flowchart illustrating an example of an operation of the color scheme evaluation apparatus, according to the third exemplary embodiment of the present invention.

DESCRIPTION OF EMBODIMENTS

In the following, exemplary embodiments of the present invention will be explained in details with reference to drawings. The present invention explained below relates to a color scheme evaluation apparatus and the like capable of evaluating, for example, whether a color scheme for a screen suitable for a system or a component of a screen is appropriate or not, on the design of the user interface screen of the system.

First Exemplary Embodiment

The first exemplary embodiment of the present invention will be explained with reference to FIG. 1 to FIG. 7.

Figure 1:
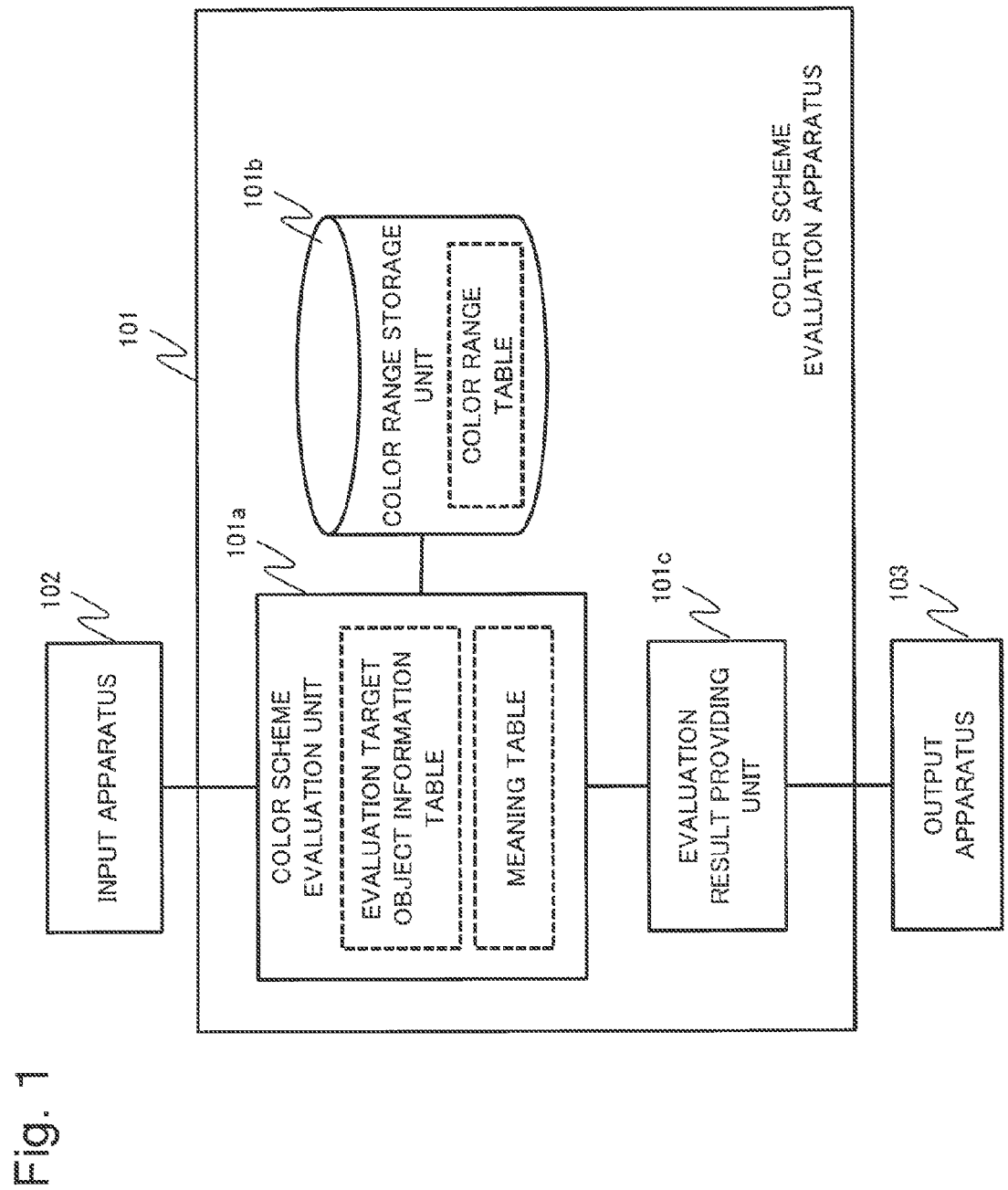
FIG. 1 is a block diagram illustrating an example of a functional configuration of a color scheme evaluation apparatus, according to a first exemplary embodiment of the present invention.

FIG. 1 is a block diagram illustrating an example of a functional configuration of a color scheme evaluation apparatus according to the first exemplary embodiment of the present invention.

A color scheme evaluation apparatus 101 according to the present exemplary embodiment is communicatively connected to an input apparatus 102 and an output apparatus 103. The color scheme evaluation apparatus 101 evaluates the color scheme of the evaluation target object being supplied from the input apparatus 102, on the basis of a particular evaluation criterion. The color scheme evaluation apparatus 101 supplies a result of the evaluation, to the output apparatus 103.

First, the input apparatus 102 according to the present exemplary embodiment will be explained.

The input apparatus 102 is an apparatus for supplying information about the evaluation target object, such as a component and the like constituting the system screen, which is the target of the color scheme evaluation. The configuration of the input apparatus 102 according to the present exemplary embodiment may be selected appropriately, in accordance with the specification and the like of the color scheme evaluation apparatus. For example, the input apparatus 102 may be implemented by use of an independent information processing unit such as a computer and the like, and may be implemented by use of an input peripheral device connected to the color scheme evaluation apparatus 101.

In the present exemplary embodiment, the input apparatus 102 may be communicatively connected to the color scheme evaluation apparatus 101. A connection method between the color scheme evaluation apparatus 101 and the input apparatus 102 according to the present exemplary embodiment may be selected appropriately in accordance with the specification and the like of each apparatus. For example, the input apparatus 102 may be connected to the color scheme evaluation apparatus 101 via any wireless or wired communication circuit, or may be connected by any communication bus.

Information about the evaluation target object received by the input apparatus 102 explained above may include, for example, the following information. More specifically, the information about the evaluation target object may include information for distinguishing (identifying) a particular evaluation target object. The information about the evaluation target object may include information about the color scheme of the evaluation target object. The information about the evaluation target object may include information about a group into which the evaluation target object is classified. The information about the evaluation target object may include information about a relationship between the groups.

Figure 2:
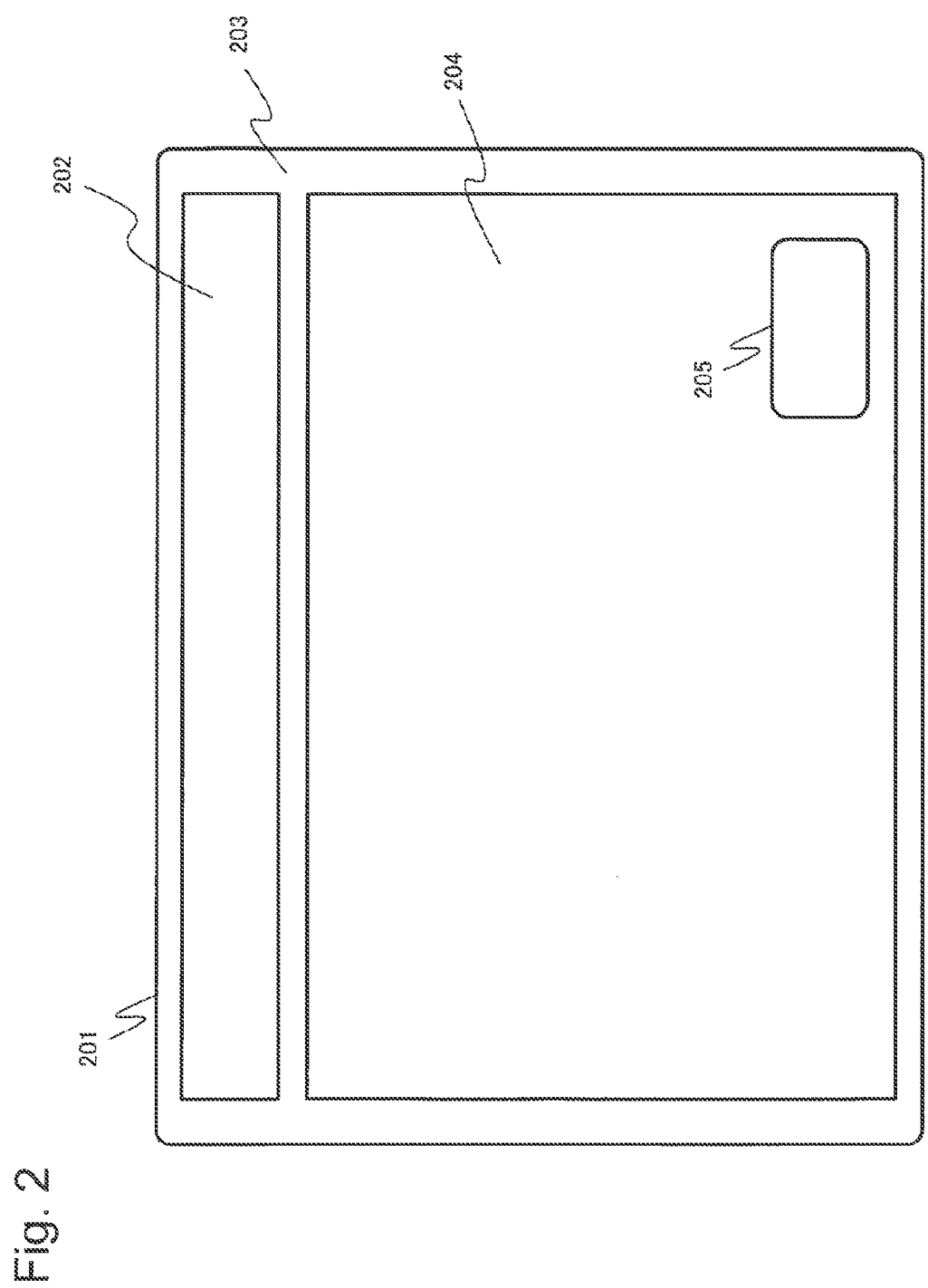
FIG. 2 is a figure illustrating an example of a screen configuration which is an evaluation target in each of the exemplary embodiments, according to the present invention.

The evaluation target object will be explained by referring to a specific example with reference to FIG. 2. FIG. 2 is a figure illustrating an example of a system screen, and components of the screen which are an evaluation target object according to the present exemplary embodiment (the same applies to each exemplary embodiment explained below).

In a case where a screen 201 as exemplified in FIG. 2 is a target of color scheme evaluation, the components constituting the screen 201 are the evaluation target objects according to the present exemplary embodiment. More specifically, on the screen 201 as illustrated in FIG. 2 for example, a title 202, a first background 203, a second background 204, and a button 205 are evaluation target objects. The screen 201 itself can be an evaluation target object as a single component.

A user (not shown) of the color scheme evaluation apparatus 101 according to the present exemplary embodiment supplies the information about the evaluation target object by using the input apparatus 102. In the present exemplary embodiment, the input method for supplying the information about the evaluation target object to the input apparatus 102, the format of the input data and the like may be selected appropriately. For example, the user may use the input apparatus 102 to supply design information defining the configuration of the screen as illustrated in FIG. 2 as an example. For example, the user may supply the information about the evaluation target object for each component constituting the screen as illustrated in FIG. 2 for example.

The input apparatus 102 according to the present exemplary embodiment may transmit the information supplied from the user to the color scheme evaluation apparatus 101 as it is. The input apparatus 102 may analyze the information to generate an evaluation-target-object-information-table as exemplified in FIG. 3 (301 in FIG. 3), a meaning table (501 in FIG. 5), and the like, and may supply (transmit) them to the color scheme evaluation apparatus 101. The user may supply information equivalent to the evaluation-target-object-information-table and the meaning table. In this case, the input apparatus 102 according to the present exemplary embodiment may transmit the information supplied by the user to the color scheme evaluation apparatus 101 as it is.

Specific configurations of the evaluation-target-object-information-table and the meaning table will be explained later.

In the following, the configuration of the color scheme evaluation apparatus 101 according to the present exemplary embodiment will be explained.

As illustrated in FIG. 1, the color scheme evaluation apparatus 101 according to the present exemplary embodiment includes a color scheme evaluation unit 101a, a color range storage unit 101b, and an evaluation result providing unit 101c. The color scheme evaluation unit 101a, the color range storage unit 101b, and the evaluation result providing unit 101c, which are the components of the color scheme evaluation apparatus 101, are communicatively connected with each other.

The color range storage unit 101b stores information about a color range used in the color scheme evaluation according to the present exemplary embodiment. The color range storage unit 101b according to the present exemplary embodiment stores, as the information about the color range, information including a color name and a range of color values corresponding to the color name by associating them. In this case, the color value is a color specification value representing the color in a particular color specification system for expressing a color. In the present exemplary embodiment, the range of the color values corresponding to the color name may be a range of the color values that are generally recognized as being the same or substantially the same color tone, when a person recognizes a particular color expressed by the color name.

Figure 4:
FIG. 4 is a figure illustrating an example of a table representing a color name and a range of color values (a range of color phases) associated with the color name.

For example, the color range storage unit 101b according to the present exemplary embodiment may store the color name and the range of color values by associating them with use of a format as shown in a color range table 401 as illustrated in FIG. 4. In the following explanation, the color range table 401 defining the relationship between the color name and the range of the color values as exemplified in FIG. 4 may be referred to as a color range table.

The color range table 401, as exemplified in FIG. 4 as a specific example according to the present exemplary embodiment, expresses a range of the color values 401b by using a color phase value (Hue value) of an HLS (Hue, Lightness, Saturation) color space. The HLS color space is configured as a three-dimensional color space consisting of color phase, brightness, and chroma saturation. The HLS color space is a color specification system capable of expressing a color of an object.

In the HLS color space, the color phase is expressed as an H value ("$0 \leq H \leq 360$"), the brightness is expressed as an L value ("$0 \leq L \leq 1$"), and the chroma saturation is expressed as an S value ("$0 \leq S \leq 1$"). When consistency of the color scheme is provided by unifying the color tones, the color is classified into accordance with the color phase (H value) indicating the color tone. Therefore, the ranges of the H values are described in the color range table as illustrated in FIG. 4 as an example. As an example, in the color range table as illustrated in FIG. 4, the range of the color values (H values) corresponding to the color name "green" are defined as "$70 \leq H \leq 155$", and the H values corresponding to "blue" are defined as "$155 \leq H \leq 255$".

The expression method of the color range according to the present exemplary embodiment is not limited to the HLS color space explained above, any other color specification system that can express a color specification as a numerical value may be adopted. Examples of other color specification systems include NCS (Natural Color System) color specification system, RGB (Red, Green, Blue) color specification system, and DIN (Deutsche Industrie Normen) color specification system and the like.

The color names 401a and the numerical values of the ranges of the color values described in the color range table illustrated in FIG. 4 are specific examples, and the present exemplary embodiment is not limited thereto. In the present exemplary embodiment, for example, the user may set any distinguishable name to the color name 401a in the color range table 401. In accordance with the characteristics and the like of the evaluation target, a value in a range recognized as being substantially the same as the color recognized by the color name 401a may be appropriately allocated to the range of the color values 401b, corresponding to the particular color name 401a.

In the following, the color scheme evaluation unit 101a according to the present exemplary embodiment will be explained.

The color scheme evaluation unit 101a refers to the color range table included by the color range storage unit 101b (for example, the color range table 401 as illustrated in FIG. 4 as an example), to identify the range of the color arranged to a component of the screen which is an evaluation target object. Then, the color scheme evaluation unit 101a evaluates the consistency and the like of the color scheme of the evaluation target object.

The color scheme evaluation unit 101a stores the information about the evaluation target object supplied from the input apparatus 102. In a specific example, the color scheme evaluation unit 101a extracts, from the information about the evaluation target object, information for distinguishing (identifying) an evaluation target object, information about the color scheme of the evaluation target object, and information about a group into which the evaluation target object is classified. For example, the color scheme evaluation unit 101a may store such extracted information by the form such as the evaluation-target-object-information-table 301 as exemplified in FIG. 3.

As described above, in a case where the input apparatus 102 generates the evaluation-target-object-information-table 301 and transmits the evaluation-target-object-information-table 301 to the color scheme evaluation apparatus 101, the color scheme evaluation unit 101a may be configured to store the transmitted evaluation-target-object-information-table 301. The color scheme evaluation unit 101a may store the information included in the evaluation-target-object-information-table 301 in any format other than the table.

The evaluation-target-object-information-table 301 as exemplified in FIG. 3 is configured as follows. More specifically, the evaluation-target-object-information-table 301 includes a component 301c which is information usable for distinguishing (identifying) a component of a screen which is an evaluation target object, a color value 301d representing a color arranged to the component by using the H value in the HLS color space, and a color name 301e assigned to a color to which the color value 301d being included. The evaluation-target-object-information-table 301 includes information 301a, 301b representing a group into which the component 301c is classified.

The groups (301a and 301b in FIG. 3) according to the present exemplary embodiment are sets formed by classifying the components of the screen which are the evaluation target objects (301c in FIG. 3), on the basis of a particular criterion. As the particular criterion for classifying the evaluation target objects into groups, for example, meaning of information displayed by the evaluation target object (similarity of information), a type of a function presented by the evaluation target object, a structure of the evaluation target object, an arrangement of the evaluation target object, or the like, may be adopted.

In the present exemplary embodiment, information about the group formed on the basis of the particular criterion (i.e., information about the group created by classifying the evaluation target object) is supplied to the color scheme evaluation apparatus 101, as a part of the information about the evaluation target object that is supplied to the input apparatus 102. In this case, for example, a user and the like may classify the evaluation target object into the group in advance in accordance with the criterion, and may supply the information about the classified group to the color scheme evaluation apparatus 101.

In the evaluation-target-object-information-table 301 as illustrated in FIG. 3 for example, "work" (301a in FIG. 3) and "screen" (301b in FIG. 3) are provided as the group. More specifically, in the case of the specific example as illustrated in FIG. 3, for example, screens used for "work 1" are "screen 1" and "screen 2". The "screen 1" is constituted by "component 1" to "component 4". The "screen 2" is constituted by "component 5" to "component 7".

In the case of the specific example as illustrated in FIG. 3, the components which are the evaluation target objects are classified into the groups of the "screens" (301b in FIG. 3), on the basis of a structural relationship with the screens in which the components are arranged. The components are also classified into the groups of the "works" (301a in FIG. 3), on the basis of a functional relationship which represents kind of "work" in which the "screen" is used.

In the present exemplary embodiment, structures such as a hierarchical structure and a parallel structure may be adopted, as necessary, between the groups into which the components are classified.

Subsequently, color scheme evaluation unit 101a extracts, from the information about the evaluation target object supplied from the input apparatus 102, information about the groups into which the evaluation target objects are classified, and information about a relationship (meaning) between the groups, and stores the extracted information. As a specific example, the color scheme evaluation unit 101a may store, for example, the extracted information about the relationship between the evaluation target objects, as a meaning table 501 being exemplified in FIG. 5.

In this case, the information about the relationship between the groups may include information about the relationship between multiple evaluation target objects classified into the same group. The information about the relationship between the groups may include information about the relationship between one or more evaluation target objects classified into different groups. In the following description, the relationship between multiple evaluation target objects classified into the same group may be referred to as a "relationship in the same group". The relationship between one or more evaluation target objects classified into different groups may be referred to as a "relationship between different groups". In the following description, when the relationship is simply referred to as the "relationship between groups", such description includes the relationship in the same group and the relationship between different groups.

In the present exemplary embodiment, the relationship between groups is information representing the degree of relationship between evaluation target objects classified into each group (including the same group), on the basis of the particular criterion such as described above. In the present exemplary embodiment, a "distance relationship" for the relationship between groups is provided, as an example of the degree of relationship between evaluation target objects (i.e., relationship between groups).

More specifically, for example, in the present exemplary embodiment, when the relationship in the same group is set to "close", such relationship may indicate that the degree of relationship between the evaluation target objects classified into the same group is high. For example, it is assumed that meaning of information displayed by the evaluation target object (similarity of information) is used as a "particular criterion" for classifying an evaluation target object into a group described above, described above. In this case, for example, multiple evaluation target objects classified into the same group (i.e., evaluation target objects of which relationship is "close") may display information having close (similar) meaning (i.e., information displayed by the evaluation target object is similar). Likewise, for example, it is assumed that a type of a function (similarity of a function) presented by the evaluation target object is used as the "particular criterion" for classifying the evaluation target object into the group, described above. In this case, multiple evaluation target objects classified into the same group (i.e., the evaluation target objects of which relationship is "close") may provide close (similar) functions (i.e., the functions provided by the evaluation target objects are similar).

For example, in the present exemplary embodiment, it is assumed that the relationship between different groups is set to "far". In this case, such relationship may indicate that the degree of relationship between evaluation target objects being classified into groups different from each other is low. For example, assuming a case in which the meaning of information displayed by the evaluation target object (similarity of information) is used as the "particular criterion" for classifying the evaluation target object into the group, described above. In this case, multiple evaluation target objects classified into groups different from each other (i.e., evaluation target objects of which relationship is "far") may display information of which meaning is far (i.e., information displayed by the evaluation target object is not similar to each other). Likewise, for example, assuming a case in which the type of the function presented by the evaluation target object (similarity of information) is used as the "particular criterion" for classifying the evaluation target object into the group, described above. In this case, multiple evaluation target objects classified into groups different from each other (i.e., evaluation target objects of which relationship is "far") may provide functions not similar to each other.

The present exemplary embodiment is not limited to the above, and the degree of relationship between groups (distance relationship) can be set in any way in accordance with any criterion adopted as the "particular criterion" for classifying the evaluation target object into the group, described above.

Hereinafter, the relationship between groups will be explained with reference to a specific example. For example, the meaning table 501 as illustrated in FIG. 5 includes information about a group (501a in FIG. 5) and information about relationship between groups (group relationship information, 501b in FIG. 5). That is, in the meaning table 501, a group into which an evaluation target object is classified and group relationship information about the group is included.

The 501a in FIG. 5 is information indicating whether the evaluation target objects are classified into the same group. In the 501b in FIG. 5, the relationship between groups (relationship between evaluation target objects classified in that group) is set.

First, for example, in the meaning table 501 as illustrated in FIG. 5, for the work group (301a in FIG. 3), "close" is set for a relationship in the same work group ("same work" in 501a). Also, "far" is set for a relationship between different work groups ("different works" in 501a).

For example, in the meaning table 501 as illustrated in FIG. 5, for a screen group (the 301b in FIG. 3), "close" is set for a relationship between groups in the same screen ("same screen" in 501a). With regard to evaluation target objects classified into different screen groups ("different screen" in 501a), a relationship between the group of the screen and the group of the work are taken into consideration. More specifically, when evaluation target objects being classified into different screen groups are also classified into the group of the same work, "close" is set in the relationship between those evaluation target objects. In a case where the evaluation target objects being classified into different screen groups are also classified into different work groups, "far" is set in the relationship between those evaluation target objects.

The color scheme evaluation unit 101a evaluates each relationship between groups on the basis of the meaning table (501 as exemplified in FIG. 5). Then, the color scheme evaluation unit 101a determines a method for evaluating the color scheme for each evaluation target object on the basis of such evaluation. A specific operation of the color scheme evaluation unit 101a according to the present exemplary embodiment will be explained later.

The evaluation result providing unit 101c supplies a result of a color scheme evaluation for the evaluation target object, to the output apparatus 103. For the evaluation target object evaluated (determined) as having a problem in the color scheme by the color scheme evaluation unit 101a, the evaluation result providing unit 101c may also supply a reason of the determination as well as the result of a color scheme evaluation.

In the present exemplary embodiment, the evaluation result providing unit 101c may supply a result of the color scheme evaluation in any format that can be interpreted by the output apparatus 103 explained later. For example, in a case where the output apparatus 103 is an information processing unit such as a computer and the like, the evaluation result providing unit 101c may transmit the result of the color scheme evaluation to the information processing unit, in any data format that can be interpreted by the information processing unit. In a case where the output apparatus 103 is a display apparatus such as a monitor screen and the like, the evaluation result providing unit 101c may transmit a result of the color scheme evaluation as a display signal that can be displayed by such display apparatus.

In the following, an operation of the color scheme evaluation apparatus 101 according to the present exemplary embodiment configured as described above will be explained. In the following explanation, an operation of the color scheme evaluation apparatus 101 will be explained referring to a specific example as illustrated in FIG. 3 to FIG. 5.

First, the color scheme evaluation unit 101a refers to the evaluation-target-object-information-table (301 in FIG. 3) and a color range table (401 exemplified in FIG. 4). Then, the color scheme evaluation unit 101a sets a color name (301e in FIG. 3) for each evaluation target (301c in FIG. 3) described in the evaluation-target-object-information-table 301.

For example, as exemplified in FIG. 3, a color corresponding to (H, L, S)=(160, 0.50, 0.75) as a color value is arranged to the screen element 1. The color value corresponds to "blue", in the color range table 401. The color scheme evaluation unit 101a sets the color name "blue" in the evaluation-target-object-information-table (301 in FIG. 3), as the color name of the screen element 1 (301c in FIG. 3).

Subsequently, the color scheme evaluation unit 101a provides a color scheme evaluation criterion for the evaluation target object, on the basis of the relationship between groups.

The color scheme evaluation unit 101a according to the present exemplary embodiment sets, as basic evaluation criteria of a color scheme evaluation, a similarity of color schemes between evaluation target objects being classified into a group of which relationship is set as "close", and a non-similarity of a color scheme between evaluation target objects being classified into a group of which relationship is set as "far". In the present exemplary embodiment, the "similar" color scheme may include the same color scheme.

For example, when colors arranged to the evaluation target objects being classified into the group in which the relationship is set as "close", are unified under the same color range, a consistency can be provided in the color scheme. Therefore, the user can recognize that the relationship between the evaluation target objects classified into that group is close. That is, for example, the user can recognize that the evaluation target objects classified into that group have a common feature, in the meaning of the information indicated by the evaluation target, an arrangement of the evaluation target object, or the type of the function presented by the evaluation target object, and the like.

On the other hand, easily distinguishable colors (different colors) are arranged to evaluation target objects being classified into a group of which relationship is set as "far". Therefore, the user can recognize that the relationship between the evaluation target objects classified into that group is "far". That is, the user can recognize that, for example, the evaluation target objects classified into that group do not have common feature, in the meaning of information displayed by the evaluation target, the arrangement of the evaluation target objects, the type of the function presented by the evaluation target object, or the like.

Therefore, when the colors, within the same color range, are arranged to the evaluation target objects being classified into a group of which relationship is set as "close", the color scheme evaluation unit 101a according to the present exemplary embodiment determines that there is no problem in the color scheme, and in the other case, the color scheme evaluation unit 101a according to the present exemplary embodiment determines that there is a problem in the color scheme. A group in which the relationship is set as "close" may include the same group, according to the present exemplary embodiment.

Further, when the colors included in different color ranges are arranged to the evaluation target objects being classified into a group of which relationship is set as "far", the color scheme evaluation unit 101a according to the present exemplary embodiment determines that there is no problem in the color scheme, and in the other case, the color scheme evaluation unit 101a according to the present exemplary embodiment determines that there is a problem in the color scheme.

The color scheme evaluation unit 101a according to the present exemplary embodiment may determine whether the colors are in the same color range by determining, for example, whether the colors belongs to a range (401b) of color values corresponding to the same color name (401a) in the color range table 401 exemplified in FIG. 4. The color scheme evaluation unit 101a may determine whether the colors are in different color ranges by determining, for example, whether the colors belongs to the range (401b) of color values corresponding to a different color name (401a) in the color range table 401 exemplified in FIG. 4.

The evaluation method will be explained with reference to the meaning table 501 as illustrated in FIG. 5. The color scheme evaluation unit 101a according to the present exemplary embodiment interprets the meaning table 501 illustrated in FIG. 5, and evaluates the color scheme for each evaluation target object on the basis of the following evaluation criteria ((A) to (D) explained below).

(A) The color scheme evaluation unit 101a evaluates whether colors in different color ranges are arranged to evaluation target objects being classified into work groups different from each other. More specifically, when colors in different color ranges are arranged to evaluation target object classified into work groups different from each other, the color scheme evaluation unit 101a evaluates that there is no problem. On the other hand, when colors in the same color range are arranged to evaluation target objects classified into work groups different from each other, the color scheme evaluation unit 101a evaluates that there is a problem.

(B) The color scheme evaluation unit 101a evaluates whether colors in the same color range are arranged to evaluation target objects classified into the same work group. More specifically, when colors in the same color range are arranged to evaluation target objects classified into the same work group, the color scheme evaluation unit 101a evaluates that there is no problem. On the other hand, when colors classified in different color ranges are arranged to evaluation target objects classified into the same work group, the color scheme evaluation unit 101a evaluates that there is a problem.

(C) The color scheme evaluation unit 101a executes the same processing as (A) and (B) on the evaluation target objects classified into screen groups different from each other. More specifically, the color schemes of evaluation target objects classified into the groups are evaluated on the basis of the work groups into which the evaluation target objects are classified.

(D) The color scheme evaluation unit 101a evaluates whether colors in the same color range are arranged to evaluation target objects classified in the same screen group. More specifically, when colors in the same color range are arranged to evaluation target objects classified into the same screen group, the color scheme evaluation unit 101a evaluates that there is no problem. On the other hand, when colors classified in different color ranges are arranged to evaluation target objects classified into the same screen group, the color scheme evaluation unit 101a evaluates that there is a problem.

Subsequently, the color scheme evaluation unit 101a evaluates the color scheme for each evaluation target object, on the basis of the above described evaluation criteria. Hereinafter, a color scheme evaluation according to the present exemplary embodiment will be explained more specifically with reference to specific examples illustrated in FIG. 3 to FIG. 5.

First, the color scheme evaluation unit 101a refers to the evaluation-target-object-information-table 301 exemplified in FIG. 3, and evaluates the color scheme of a component (301c in FIG. 3), of a screen, which is an evaluation target object, on the basis of a relationship of a screen group (the criterion (D)).

The color scheme evaluation unit 101a confirms the color schemes (301e in FIG. 3) of "screen element 1" to "screen element 4" which are evaluation target objects classified into the group of "screen 1". A color "blue" is given to all of the components classified in the group of "screen 1". Therefore, since the same color range is given to evaluation target objects classified in the same screen group, the color scheme evaluation unit 101a evaluates that there is no problem in such color schemes.

Likewise, the color scheme evaluation unit 101a confirms the color schemes of the components ("screen element 4" to "screen element 13") classified in the groups of "screen 2", "screen 3", and "screen 4". In this case, since the same color is given to each of them being classified in the same group, the color scheme evaluation unit 101a evaluates that there is no problem in such color schemes.

Subsequently, the color scheme evaluation unit 101a confirms the color schemes of the components classified in "screen 5". In this case, the color schemes of the "screen element 14" and the "screen element 16" are the same ("blue"), but the color scheme of the "screen element 15" is different ("red"). Therefore, the color scheme evaluation unit 101a evaluates that there is a problem in the color schemes.

Subsequently, the color scheme evaluation unit 101a evaluates the color schemes of the components (301c in FIG. 3), of the screens, which are the evaluation target objects, on the basis of the relationship of a work group (the criterion (B)).

First, the color scheme evaluation unit 101a confirms the color schemes of the components which are the evaluation target objects being classified into the group of "work 1". In this case, the evaluation target objects are "screen element 1" to "screen element 7", and the color schemes arranged to them are the same ("blue"). Therefore, the color scheme evaluation unit 101a evaluates that there is no problem in the color scheme.

Subsequently, the color scheme evaluation unit 101a confirms the color schemes of the components which are the evaluation target objects classified in the group of "work 2". In this case, the evaluation target objects are "screen element 8" to "screen element 13". In this case, the color schemes of "screen element 8" to "screen element 10" are the same ("blue"). On the other hand, the color schemes of "screen element 11" to the "screen element 13" are the same ("orange"). In other words, the color schemes arranged for all the screen elements are not the same (more specifically, there are "blue" and "orange"). Therefore, the color scheme evaluation unit 101a evaluates that there is a problem in the color scheme.

Subsequently, the color scheme evaluation unit 101a confirms the color schemes of the components which are the evaluation target objects classified into the groups of "work 1" to "work 3" (the criterion (A)).

The "work 1" and the "work 2" are work groups different from each other, but the color schemes for the evaluation target objects ("screen element 1" to "screen element 10") classified into these work groups are the same ("blue"). In other words, since the same color is arranged to the evaluation target objects classified into different work groups, the color scheme evaluation unit 101a evaluates that there is a problem in the color scheme.

Since the screen elements classified in the group of "work 3" have already been evaluated as having a problem, the color schemes based on the relationship of the work 3 with the group of the "work 1" and the group of the "work 2" may not be evaluated.

The color scheme evaluation unit 101a evaluates the appropriateness of the color schemes of all the evaluation target objects in accordance with the above evaluation criteria. Then, when a problem is not found in evaluation by all criteria with regard to the color scheme of the screen element, the color scheme evaluation unit 101a evaluates that there is no problem about the color schemes of the screen element. When any problem is found in evaluation by any one or more criteria with regard to the color scheme of the screen element, the color scheme evaluation unit 101a evaluates that there is a problem about the color schemes of the screen element.

The color scheme evaluation unit 101a supplies (transmits) a result of the color scheme evaluation to the evaluation result providing unit 101c.

As described above, the evaluation result providing unit 101c appropriately converts the result of the color scheme evaluation received from the color scheme evaluation unit 101a into a format appropriate for the output apparatus 103, and transmits the result to the output apparatus 103.

The output apparatus 103 displays the result of the color scheme evaluation received from the color scheme evaluation apparatus 101 (evaluation result providing unit 101c). For example, the output apparatus 103 according to the present exemplary embodiment may display the result of the color scheme evaluation according to a format as exemplified in FIG. 6. For example, with regard to the screen elements determined that there is no problem in the color schemes, the output apparatus 103 may display "[OK]" as exemplified in FIG. 6. For example, with regard to the screen elements determined that there is any problem in the color schemes, the output apparatus 103 may display "[N/A]" (in this case "[N/A]" means "inappropriate") as illustrated in FIG. 6 as an example.

Figure 6:
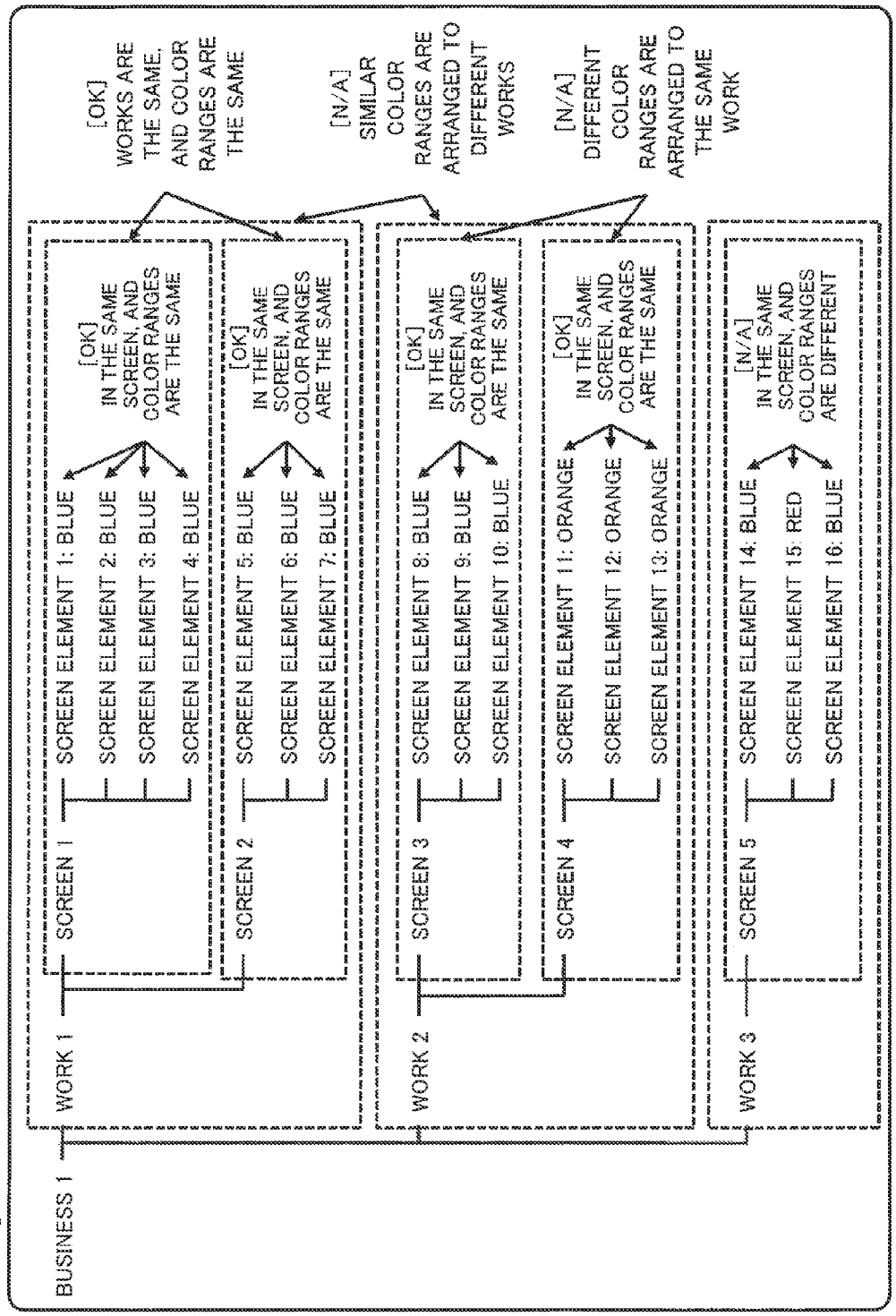
FIG. 6 is a figure illustrating an example of the result of the color scheme evaluation, according to the first exemplary embodiment of the present invention.

In the present exemplary embodiment, the method for displaying the result of the color scheme evaluation is not limited to the method as exemplified in FIG. 6. The output apparatus 103 may display the result of the color scheme evaluation of each component and the reason of the result in accordance with any method capable of displaying the result and the reason. For example, the output apparatus 103 may display the evaluation target object information and the evaluation result in association with each other as exemplified in FIG. 6, or may display the evaluation target screen and the evaluation result in association with each other.

Figure 7:
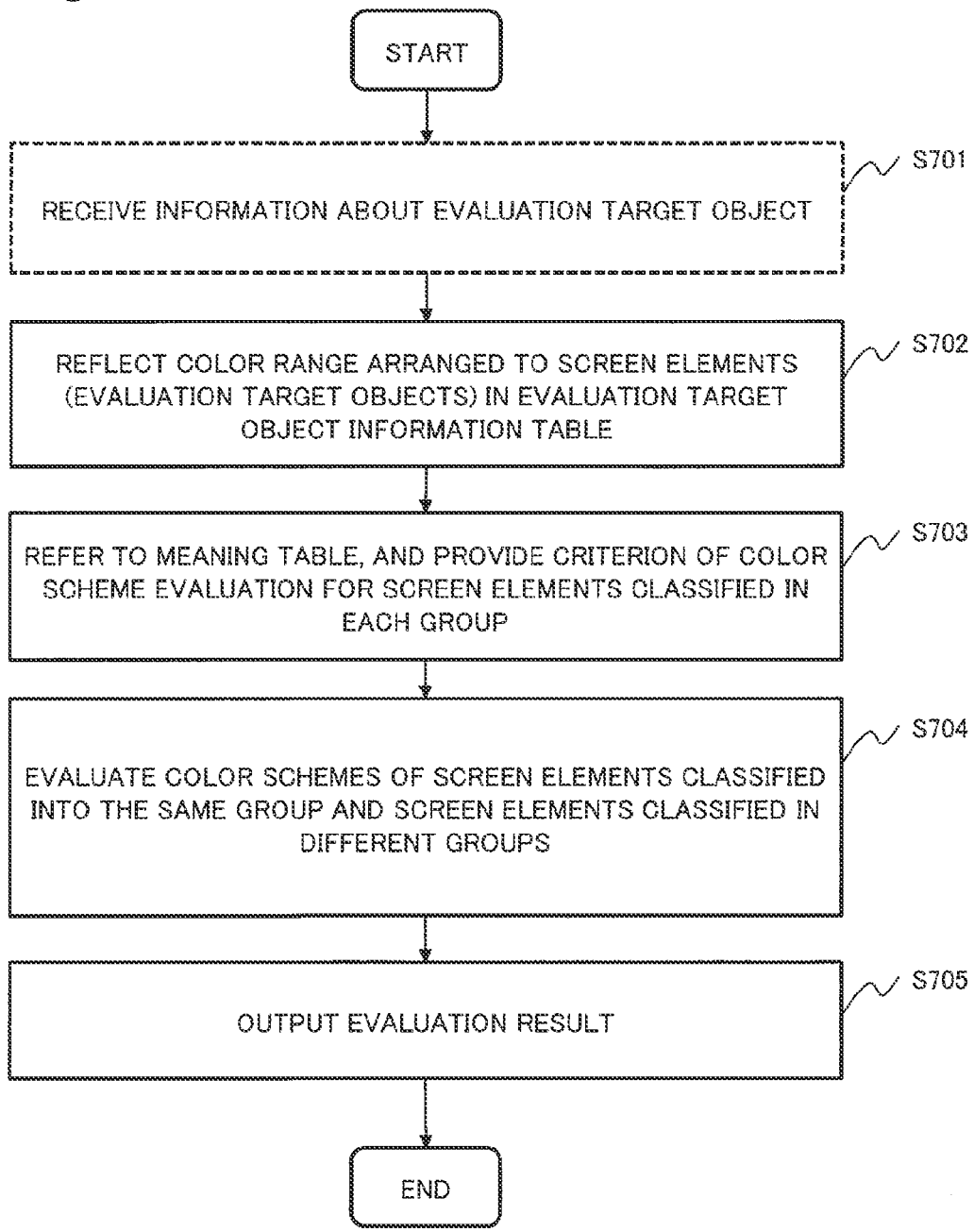
FIG. 7 is a flowchart illustrating an example of an operation of the color scheme evaluation apparatus, according to the first exemplary embodiment of the present invention.

Processing for achieving operation of the color scheme evaluation apparatus 101 according to the present exemplary embodiment explained above will be explained with reference to a flowchart as illustrated in FIG. 7 as an example.

First, the color scheme evaluation apparatus 101 receives the information about the evaluation target object from the input apparatus 102 (step S701). On this occasion, the color scheme evaluation apparatus 101 may generate the evaluation-target-object-information-table (for example, 301 in FIG. 3) and the meaning table (for example, 501 in FIG. 5) on the basis of information received from the input apparatus 102. The color scheme evaluation apparatus 101 may receive the evaluation-target-object-information-table (301) and the meaning table (501) generated by the input apparatus 102.

Subsequently, color scheme evaluation apparatus 101 refers to the color range table (for example, 401 in FIG. 4), and reflects the color ranges of the colors allocated to the screen elements (evaluation target objects) in the evaluation-target-object-information-table (step S702).

Subsequently, the color scheme evaluation apparatus 101 refers to the meaning table, and provides a criterion of the color scheme evaluation for each screen element (evaluation target object) classified into each group (step S703).

Subsequently, the color scheme evaluation apparatus 101 evaluates the color schemes of all the screen elements on the basis of the relationship of the groups in which the screen elements are classified, in accordance with the criterion of the color scheme evaluation provided in step S703 (step S704).

Subsequently, the color scheme evaluation apparatus 101 generates information about the result of the color scheme evaluation in step S704, and supplies the information to the output apparatus 103 (step S705).

The output apparatus 103 receives information about the result of the color scheme evaluation generated in step S705, and displays the evaluation result.

The color scheme evaluation apparatus 101 according to the present exemplary embodiment described above provides the criteria of the color scheme evaluation on the basis of the relationship between groups. Therefore, for example, the color scheme evaluation apparatus 101 according to the present exemplary embodiment can evaluate, when the relationship between groups is "close", whether or not consistent colors are arranged to evaluation target objects classified into the groups, in accordance with the criteria. On the other hand, when the relationship between groups is "far," the color scheme evaluation apparatus 101 according to the present exemplary embodiment can evaluate whether easily distinguishable colors (colors which belong to different color ranges) are arranged to evaluation target objects classified into the groups.

As described above, each evaluation target object is classified in the above group by using, as a criterion, the meaning of the information displayed by an evaluation target object (similarity of information), the type of the function presented by the evaluation target object, a structure or an arrangement of the evaluation target object, or the like, for example.

As described above, the color scheme evaluation apparatus 110 according to the present exemplary embodiment can perform evaluate whether the color schemes of the evaluation target objects constituting the evaluation target screen are appropriate or not. More specifically, the color scheme evaluation apparatus 110 can evaluate whether the color schemes of the evaluation target objects are appropriate or not, in view of the meaning of the information displayed by an evaluation target object, the type of the function presented by the evaluation target object, the arrangement or the structure of the evaluation target object itself, and the like.

The color scheme evaluation apparatus 110 according to the present exemplary embodiment explained above can evaluate whether the rules about the color schemes of the evaluation target objects can be easily understood by the user. For example, the color scheme evaluation apparatus 110 can evaluate whether the user can distinguish the similarity of information displayed by an evaluation target object, the similarity of the type of the function presented by the evaluation target object, the similarity of an arrangement or a structure of the evaluation target object itself, and the like, on the basis of the color schemes for the evaluation target objects.

When the evaluation of color schemes of the evaluation target objects are manually done by a person, the evaluation criteria may vary by an evaluator. Depending on the screen configuration of the evaluation target, it may require significant amount of work, to perform the evaluation manually. In contrast, according to the color scheme evaluation apparatus 110 according to the present exemplary embodiment, a certain level of evaluation result can be obtained without depending on the configuration of the evaluation target screen and the evaluator. Therefore, efficiency of evaluation of the color scheme can be greatly improved, and a possible mistake in evaluation performed by a person can be prevented.

In the above explanation, as an example of the group according to the present exemplary embodiment, the "work groups" (301a in FIG. 3) and the "screen groups" (301b in FIG. 3) have exemplified, but the present exemplary embodiment is not limited thereto. The group into which the evaluation target object is classified may be not only the above, but also, for example, a group into which an evaluation target object is classified, on the basis of information about the state of display on the system screen, such as a "normal state", a "warning state", and the like. The group into which the evaluation target object is classified may be, for example, a group into which an evaluation target object is classified, on the basis of each user using a system such as a "manager", a "generalist worker", and the like. The group into which the evaluation target object is classified may be a group into which an evaluation target object is classified in accordance with a type of a function presented by the system screen such as "a screen about information registration" or "a screen about information confirmation". As described above, in the present exemplary embodiment, a particular criteria for classifying the evaluation target object into the group, various criteria related to information displayed by an evaluation target object, the type of the function presented by the evaluation target object, an arrangement or a structure of the evaluation target object itself, and the like, may be employed.

In the above explanation, the color scheme evaluation apparatus 110 according to the present exemplary embodiment adopts, as an evaluation criterion, whether or not colors in the same color range (color range corresponding to the same color name) are arranged to evaluation target objects classified into a group of which relationship is set as "close". However, the present exemplary embodiment is not limited thereto. The color scheme evaluation apparatus 110 according to the present exemplary embodiment may also adopt, as the evaluation criterion, whether or not colors in the same range or similar color ranges are arranged to evaluation target objects classified in a group of which relationship is set as "close". In this case, a criterion for determining whether a color arranged to an evaluation target object is similar or not may be defined appropriately. The color scheme evaluation apparatus 110 may refer to, for example, the color range table as exemplified in FIG. 4 and may define, as a similar color range, a color range adjacent to each other (the upper limit value or the lower limit value of the color value is adjacent). The color scheme evaluation apparatus 110 may determine, as a similar color range, colors included in a certain range from a border of color values of adjacent color ranges.

A similarity (resemblance) determination of a color scheme according to the present exemplary embodiment is not limited to the above. For example, the color scheme evaluation apparatus 110 may calculate an average value of colors of evaluation target objects classified into a particular group and an average value of colors of other evaluation target objects classified into another group. Then, the color scheme evaluation apparatus 110 may determine a similarity of a color scheme for each group on the basis of a difference between two average values. Further, for example, the color scheme evaluation apparatus 110 may calculate the median value of colors of evaluation target objects classified into a particular group and the median of colors of other evaluation target objects classified in another group. Then, the color scheme evaluation apparatus 110 may determine a similarity of color schemes for each group on the basis of the difference between two median values. That is, the similarity determination method of the color schemes according to the present exemplary embodiment may adopt any method capable of determining a similarity of colors on the basis of the color values arranged to the evaluation target objects and the particular criterion. This is also applicable to each of the following exemplary embodiments.

In the above explanation, the user uses the input apparatus 102 to supply the information about the evaluation target object, but the present exemplary embodiment is not limited thereto.

For example, the input apparatus 102 may collect a screen of a system which is to be evaluated, and analyze information about the corrected screen to supply the information into the color scheme evaluation apparatus 101. In the collection of the system screen, for example, an automatic processing tool automatically executing an operation of the system screen and the like may be used. In a case where the system screen is displayed in online processing via a network, screen display data transmitted and received may be captured. The input apparatus 102 may analyze a software program (computer program) providing the system screen, being supplied to the input apparatus 102, and extract configuration information about the screen.

Further, for example, information including such as a design document, a manual, a user guide, and the like for the particular system may be supplied into the input apparatus 102, and the input apparatus 102 may extract information about the evaluation target object (including information about groups) from the result obtained by analyzing the information. This is also applicable to each of the following exemplary embodiments.

In the above explanation, the color scheme evaluation apparatus 101 and the input apparatus 102 are configured as components independent from each other, however, the present exemplary embodiment is not limited thereto. The color scheme evaluation apparatus 101 according to the present exemplary embodiment may include a function corresponding to the input apparatus 102, inside of the color scheme evaluation apparatus 101. In this case, the color scheme evaluation apparatus 101 according to the present exemplary embodiment may be configured so that the user can directly input the information about the evaluation target object into the color scheme evaluation apparatus 101. This is also applicable to each of the following exemplary embodiments.

In the above explanation, color scheme evaluation unit 101a interprets, for example, the meaning table 501 as illustrated in FIG. 5, and evaluates the color scheme on the basis of the criteria described in (A) to (D). In the present exemplary embodiment, for example, the color scheme evaluation unit 101a may generate the evaluation criteria by interpreting the meaning table 501 exemplified in FIG. 5. The color scheme evaluation unit 101a may store multiple evaluation criteria in advance, and may appropriately select a criterion from the stored evaluation criteria on the basis of the content of the meaning table 501. Not limited to the above, the color scheme evaluation unit 101a according to the present exemplary embodiment may interpret the meaning table exemplified in FIG. 5, and may set the evaluation criteria by using an appropriate method as necessary. This is also applicable to each of the following exemplary embodiments.

In the meaning table 501 exemplified in FIG. 5, the relationship between groups (501b in FIG. 5) is expressed by expressions such as "far", "close", and the like, but the present exemplary embodiment is not limited thereto. In the relationship between groups (501b), the degree of relationship between groups (distance relationship) may be set by use of any expression. This is also applicable to each of the following exemplary embodiments.

In the relationship between groups 501b in the meaning table 501, for example, a distance relationship between groups may be set on the basis of a criterion value which can be used for determining a distance relationship between particular groups. For example, when the distance relationship (the value representing the distance relationship) between particular groups is equal to or less than the particular criterion value, the relationship between groups 501b is set to information indicating that the relationship between groups is "close". When the distance relationship between particular groups is larger than the particular criterion value, the relationship between groups 501b is set to information indicating that the relationship between groups is "far".

A distance relationship between groups may be set in multiple levels for the relationship between groups 501b between groups by providing multiple criterion values. In this case, for example, the color scheme evaluation unit 101a may evaluate whether colors in the same color range are arranged to the evaluation target objects being classified into the closest group on the basis of the distance relationship in multiple levels. The color scheme evaluation unit 101a may evaluate whether colors in the adjacent color ranges are arranged to the evaluation target objects being classified into the second closest group. The color scheme evaluation unit 101a may evaluate whether colors in different color ranges are arranged to the evaluation target objects being classified into the farthest group.

A flag corresponding to the distance relationship (for example, TRUE when the relationship is close, and FALSE when the relationship is far, and the like) may be used for to the relationship between groups 501b, to set the distance relationship between the groups.

A label indicating a distance relationship may be used for the relationship between groups 501b, to set distance relationship between the groups. In this case, the color scheme evaluation unit 101a may store the evaluation criterion corresponding to such label in advance, or may generate the evaluation criterion. The color scheme evaluation unit 101a may evaluate the color schemes for the evaluation target objects on the basis of an evaluation criterion corresponding to such label.

Second Exemplary Embodiment

In the following, a second exemplary embodiment according to the present invention will be explained. In the following explanation, distinctive portions according to the present exemplary embodiment will be mainly explained, and the explanation about the same configuration as the first exemplary embodiment is omitted.

A color scheme evaluation apparatus (801 in FIG. 8) according to the present exemplary embodiment evaluates the color schemes of the evaluation target objects in view of not only the color range of the color arranged to each evaluation target unit, but also a difference in the color arranged to the evaluation target object. The color scheme evaluation apparatus (801 in FIG. 8) according to the present exemplary embodiment is different from the color scheme evaluation apparatus (101 in FIG. 1) according to the first exemplary embodiment, in that point. Hereinafter, such difference will be mainly explained.

Figure 8:
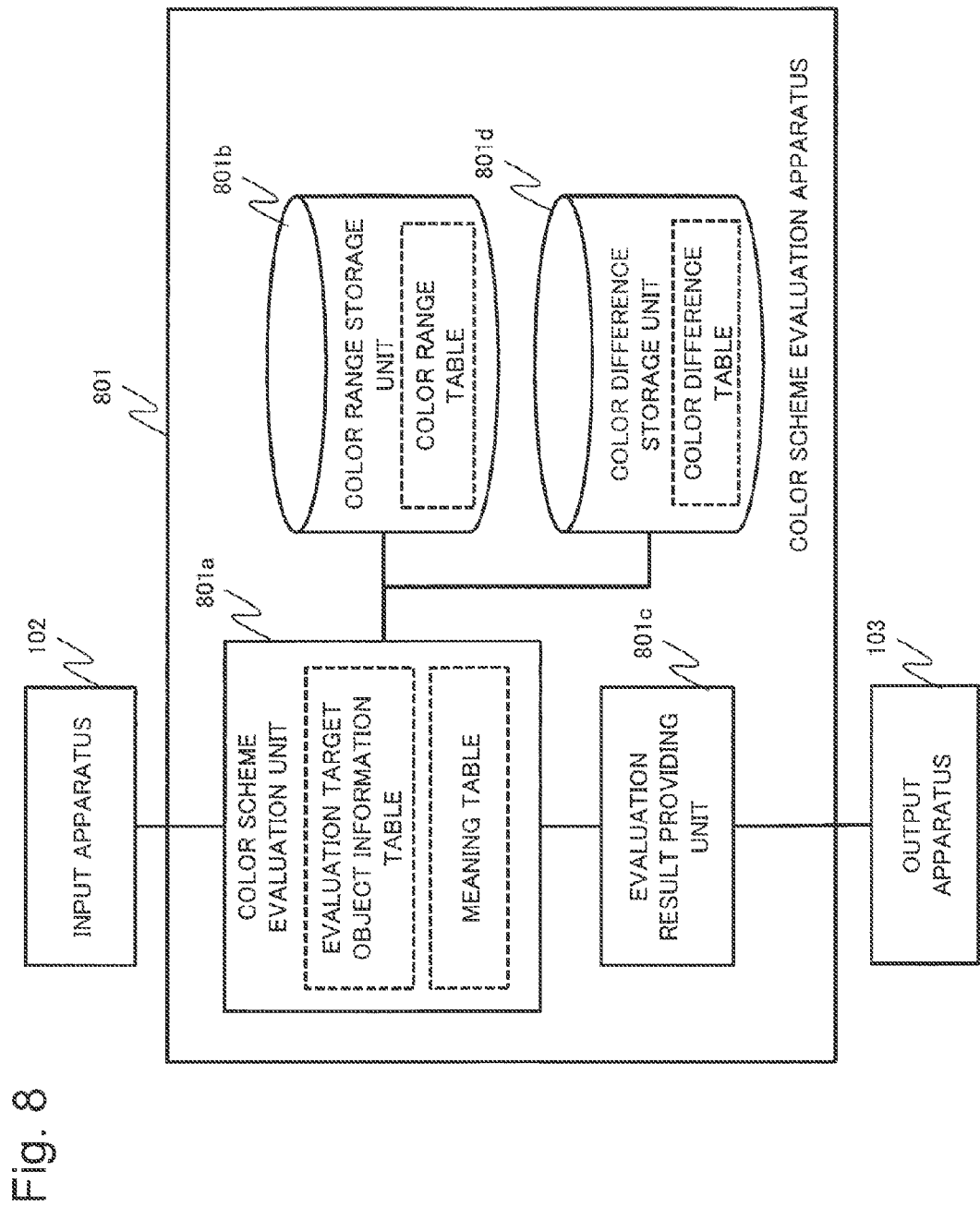
FIG. 8 is a block diagram illustrating an example of a functional configuration of the color scheme evaluation apparatus, according to the first exemplary embodiment of the present invention.
Figure 12:
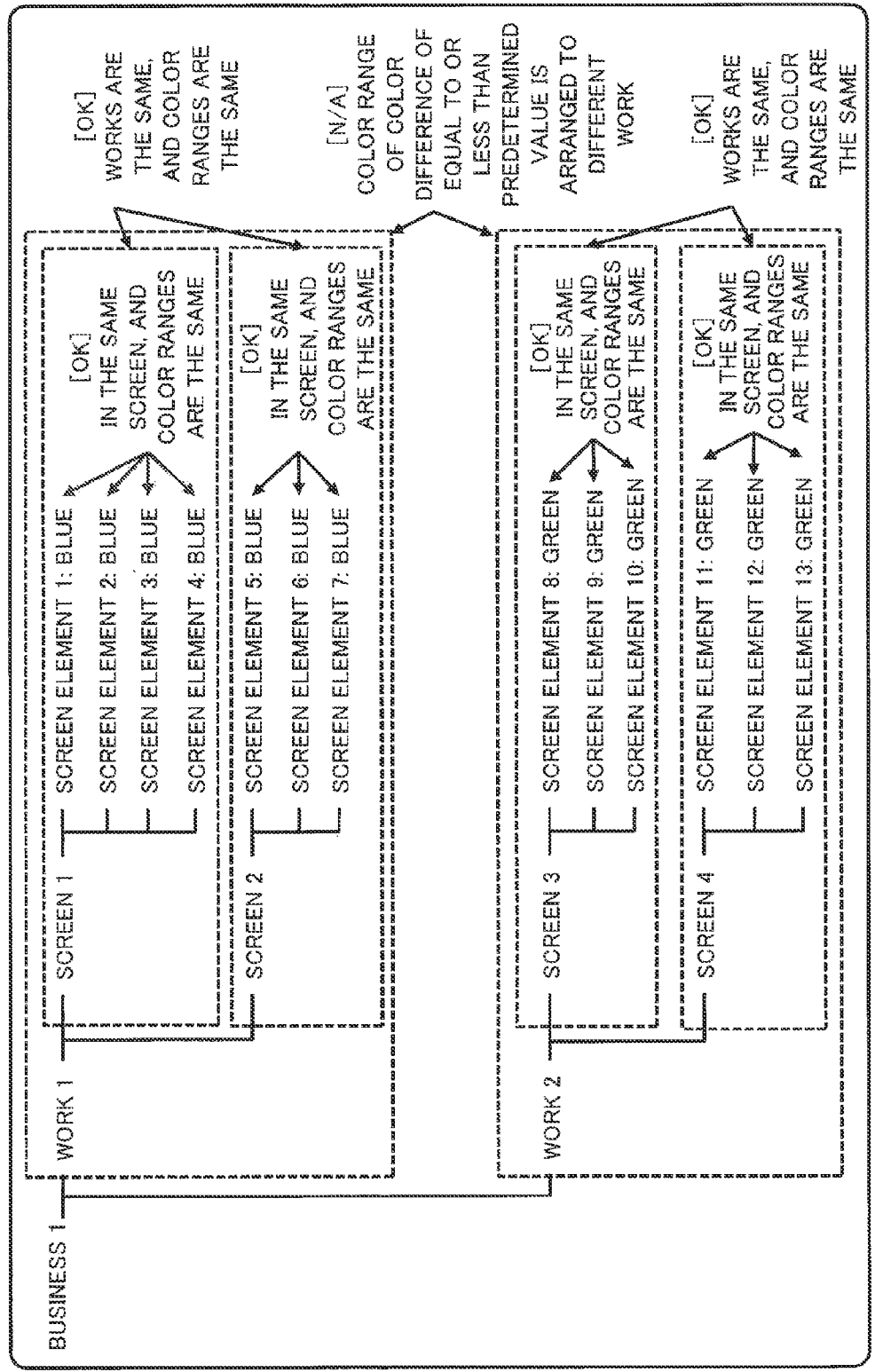
FIG. 12 is a figure illustrating an example of the result of the color scheme evaluation, according to the second exemplary embodiment of the present invention.

FIG. 8 is a block diagram exemplifying a functional configuration of a color scheme evaluation apparatus according to the second exemplary embodiment of the present invention. In FIG. 8, an input apparatus 102 and an output apparatus 103 may be the same as those of the first exemplary embodiment, and therefore explanation thereabout is omitted.

As illustrated in FIG. 8, a color scheme evaluation apparatus 801 according to the present exemplary embodiment includes a color scheme evaluation unit 801a, a color range storage unit 802b, an evaluation result providing unit 801c, and a color difference storage unit 801d. The color scheme evaluation unit 801a, the color range storage unit 802b, the evaluation result providing unit 801c, and the color difference storage unit 801d, which are components of the color scheme evaluation apparatus 801, are communicatively connected with each other.

The color range storage unit 801b and the evaluation result providing unit 801c may be the same as the color range storage unit 101b and the evaluation result providing unit 101c according to the first exemplary embodiment respectively, and the explanation thereabout is omitted.

The color difference storage unit 801d stores information about a threshold value of a color difference being referred to when evaluating whether colors in adjacent color ranges can be distinguished or not. In the present exemplary embodiment, when a color in a particular color range and another color in another color range adjacent to the particular color range are apart by a distance equal to or larger than a threshold value of the color difference, the color scheme evaluation apparatus 801 determines that these colors can be easily distinguished.

For example, the color difference storage unit 801d according to the present exemplary embodiment may store information about the color difference by using a format such as a color difference table (901 in FIG. 9) as exemplified in FIG. 9. The color difference table 901 stores a border of each color range (901a in FIG. 9, for example "orange and yellow" and the like) and a color difference value which is to be kept at each border (901b in FIG. 9) by associating them with each other. In the color difference table 901 exemplified in FIG. 9, the color difference is expressed by using a color phase value (H value) in an HLS space.

In the color difference table 901 exemplified in FIG. 9, the value of color difference (901b in FIG. 9) is expressed by using the color phase value (H value) in the HLS space, however the color specification space according to the present exemplary embodiment is not limited thereto, same as the first exemplary embodiment. The color names as illustrated in FIG. 9 ("orange" "yellow" "blue" "green" "purple" and the like described in 901a in FIG. 9) and the values of the color difference (901b in FIG. 9) are examples, and the present exemplary embodiment is not limited thereto.

The color scheme evaluation unit 801a according to the present exemplary embodiment refers to the color range table stored by the color range storage unit 801b (for example, the color range table 401 as illustrated in FIG. 4) and the color difference table stored by the color difference storage unit 801d (for example, the color difference table 901 as illustrated in FIG. 9). Then, the color scheme evaluation unit 801a identifies the range of the color arranged to the component of the screen which is the evaluation target object, and evaluates the consistency and the like of the color schemes of the evaluation target objects.

Like the first exemplary embodiment, the color scheme evaluation unit 801a according to the present exemplary embodiment stores an evaluation-target-object-information-table generated on the basis of information supplied by the input apparatus 102 and a meaning table.

In the following, an operation of the color scheme evaluation apparatus 801 according to the present exemplary embodiment configured as described above will be explained. Hereinafter, it is assumed that the color scheme evaluation apparatus 801 according to the present exemplary embodiment includes an evaluation-target-object-information-table 1001 exemplified in FIG. 10 and the meaning table 501 exemplified in FIG. 5 will be explained, as a specific example.

First, like the first exemplary embodiment, the color scheme evaluation unit 801a according to the present exemplary embodiment refers to an evaluation-target-object-information-table (for example, 1001 in FIG. 10) and color range table (for example, 401 as illustrated in FIG. 4). The color scheme evaluation unit 801a reflects the color name corresponding to the color scheme of each evaluation target described in the evaluation-target-object-information-table 1001 in the color name (1001e in FIG. 10) of the evaluation-target-object-information-table 1001.

Subsequently, like the first exemplary embodiment, the color scheme evaluation unit 801a provides a color scheme evaluation criterion for the evaluation target object on the basis of the relationship between groups. Like the first exemplary embodiment, the color scheme evaluation unit 801a according to the present exemplary embodiment adopts the similarity of the color schemes between multiple evaluation target objects classified into a group of which relationship is set as "close", as the basic evaluation criterion of the color scheme evaluation. The color scheme evaluation unit 801a also adopts the non-similarity of the color schemes between evaluation target objects classified into a group of which relationship is set as "far", as the basic evaluation criterion of the color scheme evaluation.

Therefore, when the colors, being included in the same color range, are arranged to the evaluation target objects being classified into the group of which relationship is set as "close", the color scheme evaluation unit 801a according to the present exemplary embodiment determines that there is no problem in the color scheme. In the other case, the color scheme evaluation unit 801a according to the present exemplary embodiment evaluates that there is a problem in the color scheme.

Further, the color scheme evaluation unit 801a according to the present exemplary embodiment evaluates whether colors in different color ranges are arranged to evaluation target objects classified into a group of which relationship is set as "far". In this case, when colors included in different color ranges are arranged to the evaluation target objects classified in the group of which relationship is set as "far", the color scheme evaluation unit 801a according to the present exemplary embodiment further determines whether the color ranges are adjacent or note. As a result of the determination, when the color ranges arranged to the evaluation target objects are adjacent, the color scheme evaluation unit 801a evaluates whether colors (of which color ranges are adjacent) arranged to the evaluation target objects are different by a predetermined value or more.

More specifically, the color scheme evaluation unit 801a according to the present exemplary embodiment evaluates whether colors in different color ranges are arranged to evaluation target objects classified into a group of which relationship is set as "far". When the color ranges are adjacent, the color scheme evaluation unit 801a further evaluates whether the color difference equal to or larger than a predetermined value exists between the colors in those color ranges. As a result of the evaluation, when there exists a color difference equal to or larger than the predetermined value, the color scheme evaluation unit 801*a* according to the present exemplary embodiment evaluates that there is no problem, and in the other case, the color scheme evaluation unit 801*a* according to the present exemplary embodiment evaluates that there is a problem.

In addition to the above, like the first exemplary embodiment, when different colors in color ranges that are not adjacent are arranged to evaluation target objects being classified into a group of which relationship is set as "far", the color scheme evaluation unit 801*a* according to the present exemplary embodiment evaluates that there is no problem. When the same color is arranged to evaluation target objects in a group being classified into which relationship is set as "far", the color scheme evaluation unit 801*a* evaluates that there is a problem.

By referring to the meaning table 501 exemplified in FIG. 5 as a specific example, the color scheme evaluation unit 801*a* according to the present exemplary embodiment generates a color scheme for each evaluation target object on the basis of the following evaluation criteria.

(A-2) The color scheme evaluation unit 801*a* evaluates whether colors in different color ranges are arranged to evaluation target objects classified into work groups different from each other. Further, when the color schemes of the evaluation target objects belong to different color ranges, the color scheme evaluation unit 801*a* determines whether the different color ranges are adjacent to each other. When the color ranges are adjacent, the color scheme evaluation unit 801*a* evaluates whether a color difference equal to or larger than a predetermined value exists or not between the colors belonging to adjacent color ranges.

More specifically, the color scheme evaluation unit 801*a* evaluates whether colors in different color ranges are arranged to evaluation target objects classified into work groups different from each other. When the color ranges are adjacent, the color scheme evaluation unit 801*a* further evaluates whether the color difference of equal to or larger than the predetermined value exists between colors belonging to those color ranges. As a result, when colors in the same color range are arranged to evaluation target objects classified into work groups different from each other, the color scheme evaluation unit 801*a* evaluates that there is a problem. Alternatively, when colors arranged to evaluation target objects classified into work groups different from each other, are different by a color difference of equal to or less than the predetermined value, the color scheme evaluation unit 801*a* evaluates that there is a problem. In the other case, the color scheme evaluation unit 801*a* evaluates that there is no problem.

(B) The color scheme evaluation unit 801*a* evaluates whether colors in the same color range are arranged to evaluation target objects classified into the same work group. More specifically, when colors in the same color range are arranged to evaluation target objects classified into the same work group, the color scheme evaluation unit 801*a* evaluates that there is no problem. On the other hand, when colors classified in different color ranges are arranged to evaluation target objects classified into the same work group, the color scheme evaluation unit 801*a* evaluates that there is a problem.

(C-2) The color scheme evaluation unit 801*a* executes the same evaluation as (A-2) and (B) on the evaluation target objects classified in screen groups different from each other. More specifically, the color scheme evaluation unit 801*a* evaluates the colors schemes of the evaluation target objects classified into the work groups, on the basis of the work group.

(D) The color scheme evaluation unit 801*a* evaluates whether colors in the same color range are arranged to evaluation target objects classified into the same screen group. More specifically, when colors in the same color range are arranged to evaluation target objects classified into the same screen group, the color scheme evaluation unit 801*a* evaluates that there is no problem. On the other hand, when colors classified in different color ranges are arranged to evaluation target objects classified into the same screen group, the color scheme evaluation unit 801*a* evaluates that there is a problem.

As described above, the evaluation criteria according to the present exemplary embodiment are different only in (A-2) and (C-2) from the evaluation criteria (A) to (D) according to the first exemplary embodiment.

In the first exemplary embodiment, the color scheme evaluation unit 101*a* evaluates whether colors in the same color range are arranged to evaluation target objects of which relationship is "close" on the basis of the relationship between groups. In the first exemplary embodiment, the color scheme evaluation unit 101*a* also evaluates whether colors in different color ranges are arranged to evaluation target objects of which relationship is "far".

Assuming a case that colors in different color ranges are arranged to evaluation target objects of which relationship is "far", but those different color ranges are adjacent to each other. In this case, when the difference between colors arranged to the evaluation target objects is not larger than a certain level of color difference, it may be considered to be difficult to recognize the difference in the color schemes for the evaluation target objects.

Therefore, when colors in adjacent (different) color ranges are arranged to evaluation target objects being classified into a group of which relationship is set as "far", the color scheme evaluation unit 801*a* according to the present exemplary embodiment evaluates whether there exists the color difference of equal to or larger than the predetermined value, between the arranged colors. When there is a color difference of equal to or larger than the predetermined value between the colors arranged to the evaluation target objects, the color scheme evaluation unit 801*a* evaluates that there is no problem in the color schemes. When the color difference is less than the predetermined value, the color scheme evaluation unit 801*a* evaluates that there is a problem in the color schemes. When the color ranges of colors arranged to the evaluation target objects classified in a group of which relationship is set as "far" are not adjacent, the color scheme evaluation unit 801*a* may not evaluate the color difference.

Subsequently, the color scheme evaluation unit 101*a* evaluates the color scheme of each evaluation target object on the basis of the above evaluation criteria. Hereinafter, the color scheme evaluation according to the present exemplary embodiment will be explained more specifically with reference to specific examples as illustrated in FIGS. 9 to 12.

First, with regard to the criterion (B) and the criterion (D), the color scheme evaluation unit 101*a* may perform the same processing as that of the first exemplary embodiment, and therefore, the explanation is omitted. The color scheme evaluation unit 101*a* may also evaluate the criterion (C-2) in the same manner as the criterion (A-2) and the criterion (B) explained later, and therefore, the explanation about the criterion (C-2) is omitted.

Subsequently, a case corresponding to the criterion (A-2) will be explained. The color scheme evaluation unit 801*a* according to the present exemplary embodiment refers to the evaluation-target-object-information-table 1001 exemplified in FIG. 10, and determines that all the color schemes for the components classified into group "work 1" ("screen element 1" to "screen element 7") are the same ("blue"). Likewise, the color scheme evaluation unit 801*a* determines that all the color schemes for the components classified into group "work 2" ("screen element 8" to "screen element 13") are the same ("green"). Therefore, the color scheme evaluation unit 801*a* determines that colors in different color ranges are arranged to the components classified into different groups.

Subsequently, the color scheme evaluation unit 801*a* refers to the color difference table 901 exemplified in FIG. 9, and determines whether the color schemes for the components classified into group "work 1" and the color schemes for the components classified into group "work 2" are adjacent or not. In this case, each of the color schemes are "blue" and "green", and therefore, the color schemes are determined to be adjacent. Further, the color scheme evaluation unit 801*a* extracts a color difference (901*b* in FIG. 9) which is to be kept between the color ranges "green" and "blue", from the color difference table 901. In this case, the color difference is defined as "40".

Subsequently, the color scheme evaluation unit 801*a* selects screen elements (components) of which color values arranged are closest to the border value of "blue" and "green", among the components classified in each of the groups of the group "work 1" and group "work 2".

Subsequently, the color scheme evaluation unit 801*a* determines whether difference between color values arranged to the selected components is equal to or larger than "40" which is a specification value of the color difference, as extracted above.

The processing of the color scheme evaluation unit 801*a* will be explained with reference to a schematic diagram exemplified in FIG. 11, by summarizing description above. First, the color scheme evaluation unit 801*a* confirms the color value of the color arranged to the screen element closest to the border value of the color ranges "blue" and "green", among the screen elements (components) classified into the group "work 1". In this case, the border value of the color ranges "blue" and "green" is "155", in the color range table as illustrated in FIG. 4. Subsequently, the color scheme evaluation unit 801*a* confirms the color value of the color arranged to the screen element closest to the border value of the color ranges "blue" and "green", among the screen elements classified in the group "work 2". The color scheme evaluation unit 801*a* confirms whether a color difference equal to or larger than the predetermined value exists between the color values of the screen elements classified into the group "work 1" and the group "work 2". In this case, referring to the color difference table exemplified in FIG. 9, the predetermined value for the color ranges "blue" and "green" is "40". When there is the color difference of equal to or larger than the predetermined value, the color scheme evaluation unit 801*a* evaluates that there is a no problem in the color scheme for each screen element.

In this case, for example, in the evaluation-target-object-information-table 1001 exemplified in FIG. 10, the component having a color closest to the border of the color ranges "blue" and "green" among the components classified in group "work 1" is the "screen element 1", and the color value thereof is 160. Likewise, the component having a color closest to the border of the ranges "blue" and "green" among the components classified in group "work 2" is the "screen element 14", and the color value is 140.

In this case, the color difference between the colors given to the components is "160−140=20", and the color difference is less than "40" which is the specification value of the color difference, as extracted above. Therefore, the color scheme evaluation unit 801*a* evaluates that there is a problem in the color schemes for the components classified in group "work 1" and the components classified in group "work 2".

The color scheme evaluation unit 801*a* evaluates the appropriateness of the color schemes of all the evaluation target objects in accordance with the above evaluation criteria. With regard to the screen element that is evaluated as having no problem under all the criteria, the color scheme evaluation unit 801*a* evaluates that there is no problem in that screen element. With regard to the screen element that is evaluated as having any problem in the evaluation based on any one or more criteria, the color scheme evaluation unit 801*a* evaluates that there is a problem in that screen element.

The color scheme evaluation unit 801*a* supplies (transmits) the result of the color scheme evaluation to the evaluation result providing unit 801*c*.

Like the first exemplary embodiment, the evaluation result providing unit 801*c* converts the result of the color scheme evaluation, which is supplied from the color scheme evaluation unit 801*a*, into a format appropriate for the output apparatus 103 as necessary, and transmits the result to the output apparatus 103.

Like the first exemplary embodiment, the output apparatus 103 displays the result of the color scheme evaluation received from the color scheme evaluation apparatus 801 (evaluation result providing unit 801*c*). For example, the output apparatus 103 according to the present exemplary embodiment may display the result of the color scheme evaluation in a format exemplified in FIG. 12.

Figure 13:
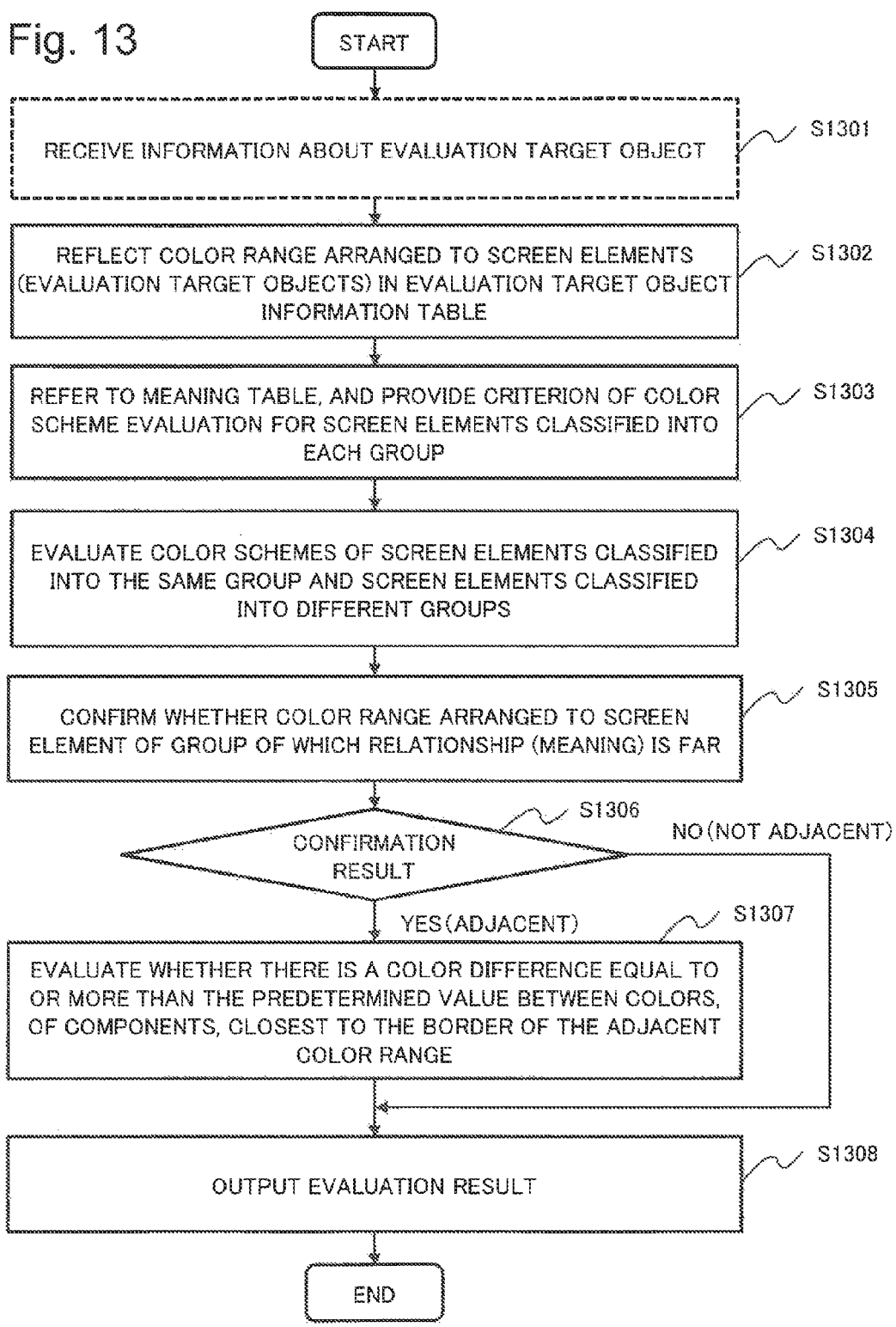
FIG. 13 is a flowchart illustrating an example of an operation of a color scheme evaluation apparatus, according to the second exemplary embodiment of the present invention.

The processing for realizing the operation of the color scheme evaluation apparatus 801 according to the present exemplary embodiment explained above will be explained with reference to a flowchart as illustrated in FIG. 13 as an example.

First, step S1301 to step S1304 exemplified in FIG. 13 may be the same processing as step S701 to step S704, respectively, exemplified in FIG. 7, and therefore, the explanation thereabout is omitted.

Subsequently, the color scheme evaluation apparatus 801 (in particular, the color scheme evaluation unit 801*a*) confirms whether the color ranges arranged to components classified into a group of which relationship is set as "far", are adjacent or not (steps S1305, S1306). In a case where the color ranges are adjacent (YES in step S1306), the color scheme evaluation apparatus 801 refers to the color difference table (for example, the color difference table 901 exemplified in the figure). Then, the color scheme evaluation apparatus 801 evaluates whether there exists a color differences equal to or larger than the predetermined value specified in the color difference table, between color values of colors closest to the border of the adjacent color ranges, among the colors arranged to components classified into a group of which relationship is set as "far" (step S1307).

In step S1307, when the color difference is equal to or larger than the certain level, the color scheme evaluation apparatus 801 determines that there is no problem, and when the color difference is less than the certain level, the color scheme evaluation apparatus 801 evaluates that there is a problem in the color schemes. When the color ranges arranged to components classified into a group of which relationship is set as "far" are not adjacent, the color scheme evaluation apparatus 801 may terminate the evaluation (NO in step S1306).

Subsequently, the color scheme evaluation apparatus 801 generates information about the result of the color scheme evaluation, and supplies the information to the output apparatus 103 (step S1308).

The output apparatus 103 receives information about the result of the color scheme evaluation generated in step S1308, and displays the evaluation result.

Like the first exemplary embodiment, the color scheme evaluation apparatus 801 according to the present exemplary embodiment explained above can evaluate, in accordance with the criteria, whether there is any consistency in the color schemes of the evaluation target objects having similar characteristics and attributes, in accordance with the characteristics, the attributes, and the like of the evaluation target objects. On the other hand, the color scheme evaluation apparatus 801 can also evaluate, in accordance with the criteria, whether easily distinguishable color schemes (colors in different color ranges) are arranged for the evaluation target objects having not a similar characteristics and attributes.

Further, the color scheme evaluation apparatus 801 according to the present exemplary embodiment evaluates appropriateness of the color schemes for the evaluation target objects classified into a group of which relationship is set as "far", in view of the color difference in the color schemes for the evaluation target objects classified into each group. Therefore, the color scheme evaluation apparatus 801 according to the present exemplary embodiment achieves similar effects as the first exemplary embodiment. Further, the color scheme evaluation apparatus 801 according to the present exemplary embodiment can evaluate whether more easily distinguishable colors are arranged to evaluation target objects classified into a group of which relationship is set as "far".

Third Exemplary Embodiment

In the following, the third exemplary embodiment according to the present invention will be explained. In the following explanation, distinctive portions according to the present exemplary embodiment will be mainly explained, and the explanation about the same configuration as the first and second exemplary embodiments explained above is omitted.

A color scheme evaluation apparatus (1401 in FIG. 14) according to the present exemplary embodiment evaluates color schemes for evaluation target objects by considering that the color difference of the colors arranged to the evaluation target objects classified into each group increases in accordance with the relationship (distance) between those groups. The color scheme evaluation apparatus 1401 according to the present exemplary embodiment is different from the color scheme evaluation apparatus according to the first and second exemplary embodiments in the above feature, and therefore, only the difference will be mainly explained.

Figure 14:
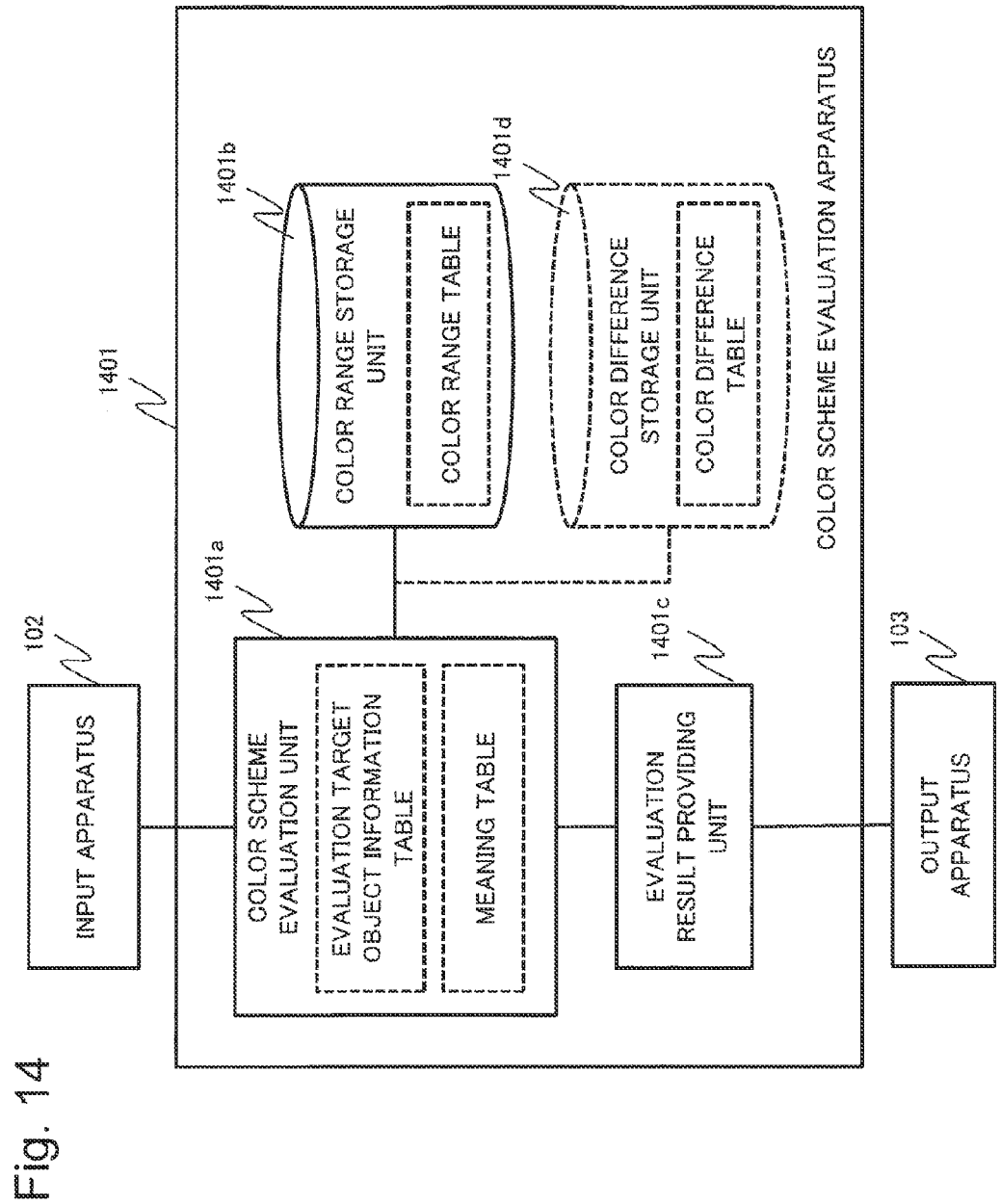
FIG. 14 is a block diagram illustrating an example of a functional configuration of a color scheme evaluation apparatus, according to a third exemplary embodiment of the present invention.

FIG. 14 is a block diagram illustrating an example of a functional configuration of a color scheme evaluation apparatus 1401 according to a third exemplary embodiment of the present invention. In FIG. 14, an input apparatus 102 and an output apparatus 103 may be the same as those of the first and second exemplary embodiments, and therefore, the explanation thereabout is omitted.

As illustrated in FIG. 14, the color scheme evaluation apparatus 1401 according to the present exemplary embodiment includes a color scheme evaluation unit 1401a, a color range storage unit 1401b, an evaluation result providing unit 1401c, and a color difference storage unit 1401d. The color scheme evaluation unit 1401a, a color range storage unit 1401b, the evaluation result providing unit 1401c, and the color difference storage unit 1401d, which are components of the color scheme evaluation apparatus 1401, are communicatively connected each other.

In this case, the color range storage unit 1401b and the evaluation result providing unit 1401c may be the same as the color range storage unit 801b and the evaluation result providing unit 801c according to the second exemplary embodiment, and therefore, the explanation thereabout is omitted.

The color difference storage unit 1401d according to the present exemplary embodiment may be the same as the color difference storage unit 801d according to the second exemplary embodiment. In the present exemplary embodiment, the color difference storage unit 1401d may or may not be provided, and therefore, the explanation thereabout is omitted.

Like the first exemplary embodiment, the color scheme evaluation unit 1401a according to the present exemplary embodiment stores an evaluation-target-object-information-table generated on the basis of information input with the input apparatus 102 and a meaning table. The color scheme evaluation unit 1401a according to the present exemplary embodiment identifies the ranges of the colors arranged to the components of the screen which are the evaluation target objects, by referring to the color range table stored by the color range storage unit 1401b, and evaluates the consistency of the color schemes and the like of the evaluation target objects.

In the following, an operation of the color scheme evaluation apparatus 1401 according to the present exemplary embodiment configured as described above will be explained. In the following description, a case where the color scheme evaluation apparatus 1401 according to the present exemplary embodiment stores a meaning table 1501 exemplified in FIG. 15 will be explained, as a specific example according to the present exemplary embodiment. In the following explanation, the evaluation-target-object-information-table may be provided in any configuration.

First, like the first and second exemplary embodiments, the color scheme evaluation unit 1401a according to the present exemplary embodiment refers to the evaluation-target-object-information-table and the color range table. Then, the color scheme evaluation unit 1401a reflects the color names, corresponding to the color schemes of the evaluation targets described in the evaluation-target-object-information-table, in the color names of the evaluation-target-object-information-table.

Subsequently, like the first and second exemplary embodiments, the color scheme evaluation unit 1401a provides a color scheme evaluation criterion for the evaluation target objects on the basis of the relationship between groups.

Like the first and second exemplary embodiments, the color scheme evaluation unit 1401a according to the present exemplary embodiment sets, as a basic evaluation criterion of a color scheme evaluation, a similarity of color schemes between (multiple) evaluation target objects classified into a group of which relationship is set as "close". The color scheme evaluation unit 1401a according to the present exemplary embodiment sets, as the basic evaluation criterion of the color scheme evaluation, a non-similarity of color schemes between evaluation target objects in a group of which relationship is classified as being "far".

Therefore, when colors being included in the same color range, are arranged to evaluation target objects classified into a group of which relationship is set as "close", the color scheme evaluation unit 1401a according to the present exemplary embodiment evaluates that there is no problem, and in the other case, the color scheme evaluation unit 1401a evaluates that there is a problem.

Further, the color scheme evaluation unit 1401a according to the present exemplary embodiment evaluates whether the colors being included in the different color ranges are arranged to evaluation target objects classified in a group of which relationship is set as "far".

In this case, the color scheme evaluation unit 1401a according to the present exemplary embodiment evaluates the color schemes of evaluation target objects classified into a group in which relationship is "extremely far", as described follows. That is, the color scheme evaluation unit 1401a evaluates whether the color schemes in the different color ranges are arranged to the evaluation target objects classified into each group, and evaluates whether a color difference between the arranged colors is large or not. In this case, the color scheme evaluation unit 1401a according to the present exemplary embodiment may evaluate, for example, whether the color difference is large or not on the basis of whether or not the color difference is equal to or larger than a predetermined criterion value.

As a result of the evaluation, when colors included in different color ranges are arranged to evaluation target objects classified in a group of which relationship is set as "far", the color scheme evaluation unit 1401a evaluates that there is no problem, and in the other case, the color scheme evaluation unit 1401a evaluates that there is a problem. Further, when the color difference of the colors arranged to evaluation target objects classified into a group of which relationship is "extremely far" is large (on the basis of the predetermined criterion and the like), the color scheme evaluation unit 1401a evaluates that there is no problem, and in the other case, evaluates that there is a problem.

Hereinafter, the meaning table 1501 exemplified in FIG. 15 will be explained as a specific example. The color scheme evaluation unit 1401a according to the present exemplary embodiment evaluates the color schemes for the evaluation target objects on the basis of the following evaluation criteria ((A-3) to (D)).

(A-3) The color scheme evaluation unit 1401a performs evaluation and determines whether colors in different color ranges are arranged to evaluation target objects classified into work groups different from each other. Further, in the meaning table 1501, the relationship between different work groups is set to "extremely far". Therefore, the color scheme evaluation unit 1401a evaluates whether the color difference of the colors given to evaluation target objects classified in work groups different from each other is sufficiently large or not.

The color scheme evaluation unit 1401a may evaluate, for example, whether the color difference of the colors arranged to evaluation target objects classified into different groups is larger than a particular criterion value. In this case, for example, for each group, the color scheme evaluation unit 1401a calculates average values (which may be hereinafter referred to as a group average color value) of color values (for example, H values in HLS color specification space) arranged to evaluation target objects classified in groups. Then, the color scheme evaluation unit 1401a may evaluate the magnitude relationship between the color difference and a particular criterion value on the basis of the following equation.

(Difference of group average color values between different groups)≥{(value obtained by equally dividing hue circle by the number of groups)−(particular threshold value $Th1$)}.

In the above equation, a value calculated by "{(value obtained by equally dividing hue circle by the number of groups)−(particular threshold value Th1)}" is adopted as the particular criterion value used to determine whether the color difference of the colors arranged to evaluation target objects classified into different groups is large or not.

For example, the color scheme evaluation unit 1401a may calculate the group average color value in the above equation by using the color values of all the components classified in one group. For example, the color scheme evaluation unit 1401a may calculate the group average color value in the above equation by using the color values belonging to the color ranges in which the largest number of color scheme is included, among all of color schemes for the components classified in one group.

In the above equation "(Value obtained by equally dividing hue circle by the number of groups)" may be a value obtained by dividing 360 by N, where the number of groups is denoted as N.

For example, the particular threshold value Th1 in the above equation may be set appropriately in accordance with the number of groups and the like, and may be set, in advance, to a value calculated from an experimental value and the like. The color scheme evaluation unit 1401a may prepare a threshold value of the color difference in accordance with the number of groups in advance. And, when the color difference is equal to or more than a threshold value, the color scheme evaluation unit 1401a may evaluate that there is no problem, and when the color difference is less than the threshold value, the color scheme evaluation unit 1401a may evaluate that there is a problem.

In a case where the number of groups is large, there is possibility that one or more multiple group average color values may be included in the same color range (for example, range of color values corresponding to the color name exemplified in FIG. 4), by dividing the hue circle by the number of groups. In this case, for example, the color scheme evaluation unit 1401a may supply a warning and the like, to the evaluation result providing unit 1401c as necessary.

(B) The color scheme evaluation unit 1401a evaluates whether colors in the same color range are arranged to evaluation target objects classified into the same work group. That is, when colors in the same color range are arranged to evaluation target objects classified into the same work group, the color scheme evaluation unit 1401a evaluates that there is no problem. On the other hand, when colors classified into different color ranges are arranged to evaluation target objects classified into the same work group, the color scheme evaluation unit 1401a evaluates that there is a problem.

(C-3) The color scheme evaluation unit 1401a executes the same evaluation as (A-3) and (B) on evaluation target objects classified in screen groups different from each other. That is, the color scheme evaluation unit 1401a evaluates the color schemes of evaluation target objects classified into that group, on the basis of the work group in which the evaluation target objects are classified.

(D) The color scheme evaluation unit 1401a evaluates whether colors in the same color range are arranged to evaluation target objects classified into the same screen group. More specifically, when colors in the same color range are arranged to evaluation target objects classified into the same screen group, the color scheme evaluation unit 1401a evaluates that there is no problem. On the other hand, when colors classified in non-similar color ranges are arranged to evaluation target objects classified in the same screen group, the color scheme evaluation unit 1401a evaluates that there is a problem.

As described above, as compared with the evaluation criteria described in the first and second exemplary embodiments, the evaluation criteria in the present exemplary embodiment is different in (A-3) and (C-3), and are the same in (B), (D).

More specifically, in the present exemplary embodiment, when the relationship between groups is "extremely far", the color scheme evaluation unit 1401a evaluates whether the color difference between colors arranged to evaluation target objects classified into each group is set larger or not (in particular, whether the color difference is larger than a particular criterion value or not). With regard to this point, the present exemplary embodiment is different from the first and second exemplary embodiments.

Subsequently, the color scheme evaluation unit 1401a evaluates the color schemes for the evaluation target objects on the basis of the evaluation criterion. Hereinafter, a color scheme evaluation according to the present exemplary embodiment will be explained with reference to specific examples as illustrated in FIG. 10 and FIG. 15.

First, the color scheme evaluation unit 1401a may process criterion (B) and the criterion (D) in the same manner as the first exemplary embodiment, and therefore, the explanation thereabout is omitted. The color scheme evaluation unit 1401a may also evaluate the criterion (C-3) in the same manner as the criterion (A-3) explained below and the criterion (B), and therefore, the explanation thereabout are omitted.

Subsequently, a case corresponding to the criterion (A-3) will be explained.

Like the second exemplary embodiment, the color scheme evaluation unit 1401a according to the present exemplary embodiment refers to the evaluation-target-object-information-table 1001 exemplified in FIG. 10. Then, the color scheme evaluation unit 1401a determines that all the color schemes for the components classified in group "work 1" ("screen element 1" to "screen element 7") are the same ("blue"). Likewise, the color scheme evaluation unit 1401a determines that all the color schemes of the components classified in group "work 2" ("screen element 8" to "screen element 13") are the same ("green"). Therefore, the color scheme evaluation unit 1401a determines that colors in different color ranges are arranged to the components classified into different groups.

The color scheme evaluation unit 1401a refers to the meaning table 1501 illustrated in FIG. 15 for example. In the meaning table 1501, the relationship between different work groups is set to "extremely far". Therefore, the color scheme evaluation unit 1401a evaluates whether a color difference is large, between the color schemes for the components classified into group "work 1" and the color schemes for the components classified into group "work 2", in the evaluation-target-object-information-table 1001 exemplified in FIG. 10.

More specifically, the color scheme evaluation unit 1401a calculates the color values arranged to "screen element 1" to "screen element 7" which are the components of the group "work 1". Likewise, the color scheme evaluation unit 1401a calculates the average value of the color values arranged to "screen element 8" to "screen element 13" which are components of the group "work 2".

Subsequently, the color scheme evaluation unit 1401a calculates, as the particular criterion value, the value of {(value equally dividing hue circle by the number of groups)−(particular threshold value Th1)}. In this case, the "(value equally dividing hue circle by the number of groups)" may be 360/2 (the number of groups is "2", i.e., "work 1" and "work 2"), and the "(particular threshold value Th1)" may be defined appropriately.

Subsequently, the color scheme evaluation unit 1401a calculates the difference between the group average color value calculated with respect to the group "work 1" and the group average color value calculated with respect to the group "work 2". Then, the color scheme evaluation unit 1401a determines whether the difference is equal to or larger than the calculated particular criterion value or not.

When the difference between the group average color values as calculated above is determined to be equal to or larger than the particular criterion value as calculated as above, the color scheme evaluation unit 1401a determines that there is no problem, and when the difference is determined to be less than the particular criterion value, the color scheme evaluation unit 1401a determines that there is a problem.

The color scheme evaluation unit 1401a evaluates the appropriateness of the color schemes of all the evaluation target objects in accordance with the above evaluation criteria. The color scheme evaluation unit 1401a evaluates that there is no problem with regard to the screen elements that is evaluated as not having any problem in the color scheme, on the basis of all the criteria. The color scheme evaluation unit 1401a evaluates that there is a problem with regard to the screen elements that is evaluated as having a problem in the evaluation based on any one or more criteria.

The color scheme evaluation unit 1401a supplies (transmits) the result of the color scheme evaluation to the evaluation result providing unit 1401c.

Like the first exemplary embodiment, the evaluation result providing unit 1401c makes the result of the color scheme evaluation received from the color scheme evaluation unit 1401a into a format suitable for the output apparatus 103 as necessary, and transmits the result to the output apparatus 103.

Like the first exemplary embodiment, the output apparatus 103 displays the result of the color scheme evaluation received from the color scheme evaluation apparatus 1401 (the evaluation result providing unit 1401c). The output apparatus 103 according to the present exemplary embodiment displays the color scheme evaluation result in the same format as the first and second exemplary embodiments.

As described above, in a case where there the number of groups is large, and one or more group average color values are included in the same color range (for example, the range of the color values corresponding to the color name exemplified in FIG. 4), the color scheme evaluation unit 1401a may supply a warning and the like, to the evaluation result providing unit 1401c. In this case, the evaluation result providing unit 1401c supplies (transmits) information about the warning and the like to the output apparatus 103. The output apparatus 103 having received information about the warning and the like may display the content of the warning to the user, e.g., display a warning message.

Processing for implementing an operation of the color scheme evaluation apparatus 1401 according to the present exemplary embodiment explained above will be explained with reference to a flowchart exemplified in FIG. 16.

First, step S1601 to step S1604 as illustrated in FIG. 16 as an example may be the same processing as step S701 to step S704, respectively, as illustrated in FIG. 7 for example, and therefore, the explanation thereabout is omitted.

Subsequently, the color scheme evaluation apparatus 1401 (in particular, the color scheme evaluation unit 1401a) determines whether there exists a group of which relationship between groups is "extremely far" (steps S1605, S1606).

In a case where there exists a group of which relationship is "extremely far" (YES in step S1606), the color scheme evaluation apparatus 1401 evaluates whether the color schemes for the screen elements classified into different groups of which relationship is "extremely far" are apart by a predetermined color difference criterion value or more (step S1607).

In step S1607, when the color schemes of the screen elements are apart by the predetermined color difference criterion value or more, the color scheme evaluation apparatus 1401 evaluates that there is no problem, and in the other case, the color scheme evaluation apparatus 1401 evaluates that there is a problem. In a case where there does not exist any group of which relationship is "extremely far", the color scheme evaluation apparatus 1401 may terminate the evaluation (NO in step S1606).

Subsequently, the color scheme evaluation apparatus 1401 generates information about the result of the color scheme evaluation, and supplies the information to the output apparatus 103 (step S1608).

The output apparatus 103 receives information about the result of the color scheme evaluation generated in step S1608, and displays the evaluation result.

Like the first and second exemplary embodiments, the color scheme evaluation apparatus 1401 according to the present exemplary embodiment explained above can evaluate, in accordance with the above criteria, whether there is a consistency in the color schemes of the evaluation target objects having similar characteristics and attributes, in accordance with the characteristics, the attributes, and the like of the evaluation target objects. On the other hand, the color scheme evaluation apparatus 1401 also evaluates, in accordance with the above criteria, whether colors of easily distinguishable color schemes (colors in different color ranges) are arranged for the evaluation target objects having non-similar characteristics and attributes.

Further, in a case where the relationship between groups is "extremely far", the color scheme evaluation apparatus 1401 according to the present exemplary embodiment evaluates whether the color difference between the color schemes for the evaluation target objects classified into each group is large or not. Therefore, the color scheme evaluation apparatus 1401 according to the present exemplary embodiment achieves the same effects as those of the first exemplary embodiment. The color scheme evaluation apparatus 1401 according to the present exemplary embodiment can also evaluate whether highly distinguishable colors are arranged to evaluation target objects of which relationship is "extremely far".

In the above explanation, the color scheme evaluation apparatus 1401 calculates the average value of the color values of colors arranged to evaluation target objects classified into each group, for each of groups different from each other. Then, the color scheme evaluation apparatus 1401 evaluates whether the difference of the average values of the groups different from each other is larger than the particular criterion value. However, the present exemplary embodiment is not limited to the above. For example, instead of the average value, the color scheme evaluation unit 1401a according to the present exemplary embodiment may use, for each group, the median of the color values of colors arranged to evaluation target objects classified into that group.

More specifically, the color scheme evaluation unit 1401a according to the present exemplary embodiment may calculate a color value of colors representing the group (for example, an average value, the median value, and the like) in accordance with an appropriate method on the basis of colors arranged to evaluation target objects classified into a particular group. Then, the color scheme evaluation unit 1401a may evaluate whether the difference (color difference) between the color value representing any group calculated with respect to that group and a color value representing another group calculated with respect to the another group, is larger than the particular criterion value or not. In this case, the method for calculating a color value representing any group and the method for calculating a color value of another group may be the same method or may be different methods.

Fourth Exemplary Embodiment

In the following, a configuration, common to each of the exemplary embodiments explained above, will be explained as the fourth exemplary embodiment of the present invention with reference to FIG. 17.

Figure 17:
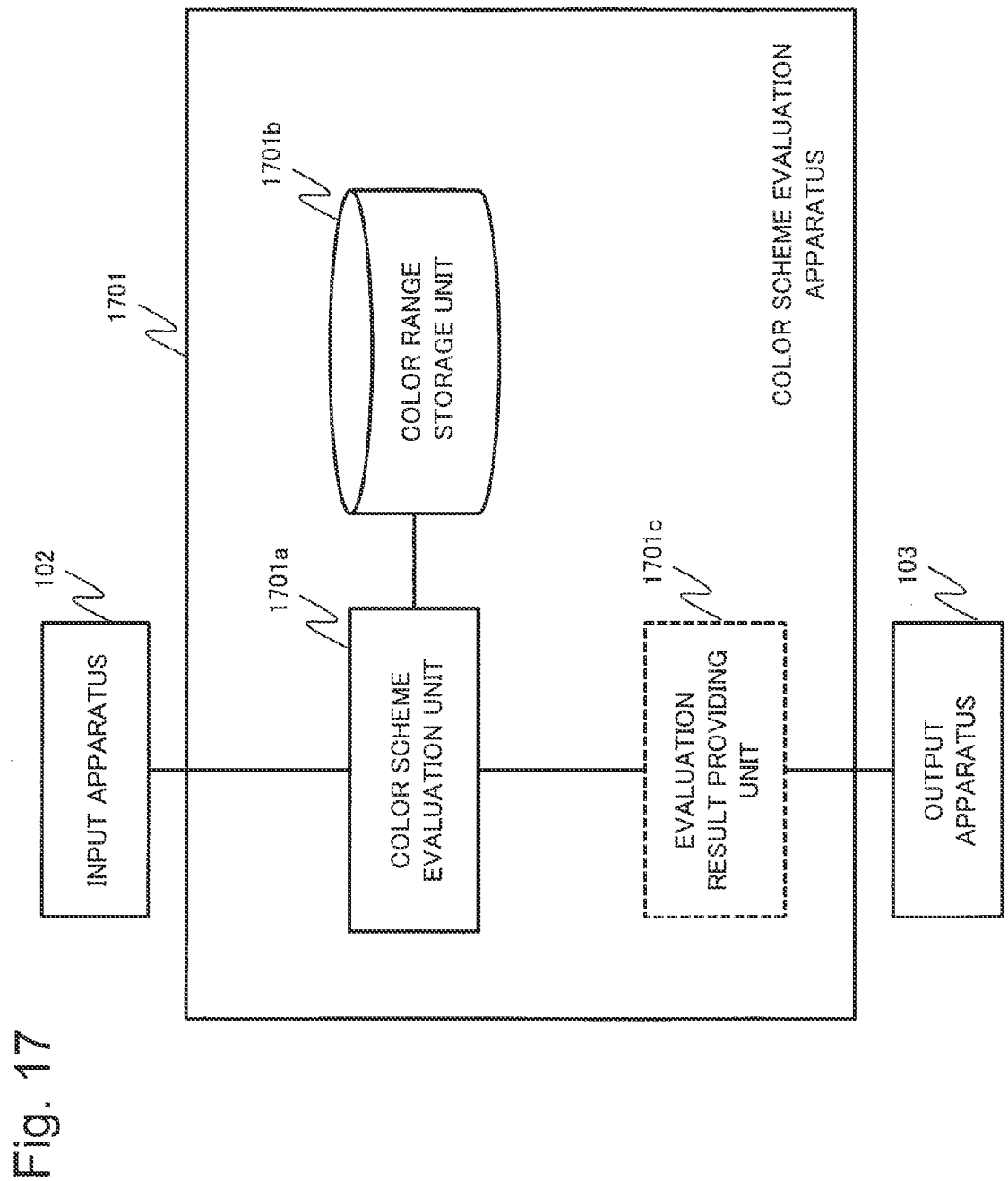
FIG. 17 is a block diagram illustrating an example of a functional configuration of a color scheme evaluation apparatus, according to a fourth exemplary embodiment of the present invention.

FIG. 17 is a block diagram illustrating an example of a functional configuration of a color scheme evaluation apparatus according to the fourth exemplary embodiment of the present invention. In FIG. 17, an input apparatus 102 and an output apparatus 103 may be the same as those of the first to third exemplary embodiments, and therefore, the explanation thereabout is omitted.

As illustrated in FIG. 17, a color scheme evaluation apparatus 1701 according to the present exemplary embodiment includes a color scheme evaluation unit 1701a and a color range storage unit 1702b. The color scheme evaluation apparatus 1701 according to the present exemplary embodiment includes an evaluation result providing unit 1701c. These components are communicatively connected with each other.

In the present exemplary embodiment, the color range storage unit 1701b stores information about the color range arranged to evaluation target objects displayed on the evaluation target screen.

The color scheme evaluation unit 1701a according to the present exemplary embodiment stores evaluation target object information including at least information about the color schemes for the evaluation target objects and information about a group obtained by classifying evaluation target objects in accordance with a particular criterion.

The color scheme evaluation unit 1701a according to the present exemplary embodiment stores group relationship information which includes the relationship between groups.

In the following, an operation of the color scheme evaluation apparatus according to the present exemplary embodiment configured as described above will be explained.

The color scheme evaluation apparatus 1701 according to the present exemplary embodiment identifies the color schemes for the evaluation target objects on the basis of the color range information held by the color range storage unit 1701b and the evaluation target object information.

Subsequently, the color scheme evaluation apparatus 1701 evaluates the color schemes for the evaluation target objects on the basis of the evaluation target object information and the group relationship information. The color scheme evaluation apparatus 1701 may transmit the evaluation result of the color scheme to the output apparatus 103. For example, the group relationship information may be stored in a format of a meaning table (501 in FIG. 5, 1501 in FIG. 15) and the like according to each of the exemplary embodiments explained above.

In the present exemplary embodiment, the evaluation target object information may information about a group classifying the evaluation target objects on the basis of a criterion of the meaning of information displayed by the evaluation target object. The evaluation target object information may include information about a group classifying the evaluation target objects on the basis of a criterion of a function presented on the evaluation target screen by the evaluation target object.

In the present exemplary embodiment, the color scheme evaluation unit 1701*a* may generate an evaluation criterion capable of evaluating the color schemes for the evaluation target objects on the basis of the group relationship information.

In the present exemplary embodiment, the color scheme evaluation unit 1701*a* may evaluate the color schemes for the evaluation target objects classified into the group on the basis of the generated evaluation criterion. More specifically, in case where the relationship between groups is "close", the color scheme evaluation unit 1701*a* may evaluate whether the color schemes included in the same range or similar color ranges a arranged for the evaluation target objects classified into each group.

In the present exemplary embodiment, in a case where the relationship between groups is "far", the color scheme evaluation unit 1701*a* may evaluate whether the color schemes included in different color ranges are arranged for the evaluation target objects classified into each group.

The color scheme evaluation apparatus 1701 according to the present exemplary embodiment explained above evaluates the color schemes for the evaluation target objects, on the basis of information about a group classifying evaluation target objects and information about a relationship between evaluation target objects classified into that group. Such group is a set that is formed by classifying evaluation target objects on the basis of a particular criterion of the characteristics, the attributes, and the like of evaluation target objects.

Therefore, for example, the color scheme evaluation apparatus 1701 according to the present exemplary embodiment can evaluate whether there is a consistency in the color schemes of the evaluation target objects having similar characteristics and attributes, in accordance with the characteristics and the attribute and the like of evaluation target objects. On the other hand, the color scheme evaluation apparatus 1701 according to the present exemplary embodiment can evaluate, whether colors of easily distinguishable color schemes (colors in different color ranges) are arranged to the evaluation target objects having non-similar characteristics and attributes.

Therefore, the color scheme evaluation apparatus 1701 according to the present exemplary embodiment can evaluate whether appropriate color schemes are arranged to evaluation target objects constituting evaluation target screens in view of the meaning of the information displayed by the evaluation target objects, and the type of the function presented by the evaluation target objects.

<Configuration of Hardware and Software Program (Computer Program)>

A hardware configuration that can achieve each of the exemplary embodiments explained above will be hereinafter explained.

Color scheme evaluation apparatuses (101, 801, 1401, 1701: hereinafter simply referred to as a color scheme evaluation apparatus) in each of the exemplary embodiments explained above may be constituted by dedicated hardware apparatuses achieving each of the functions.

In that case, each unit as illustrated in FIG. 1, FIG. 8, FIG. 14 and FIG. 17 may be achieved with hardware unifying a part or all of them (an integrated circuit and the like implementing processing logics).

Figure 18:
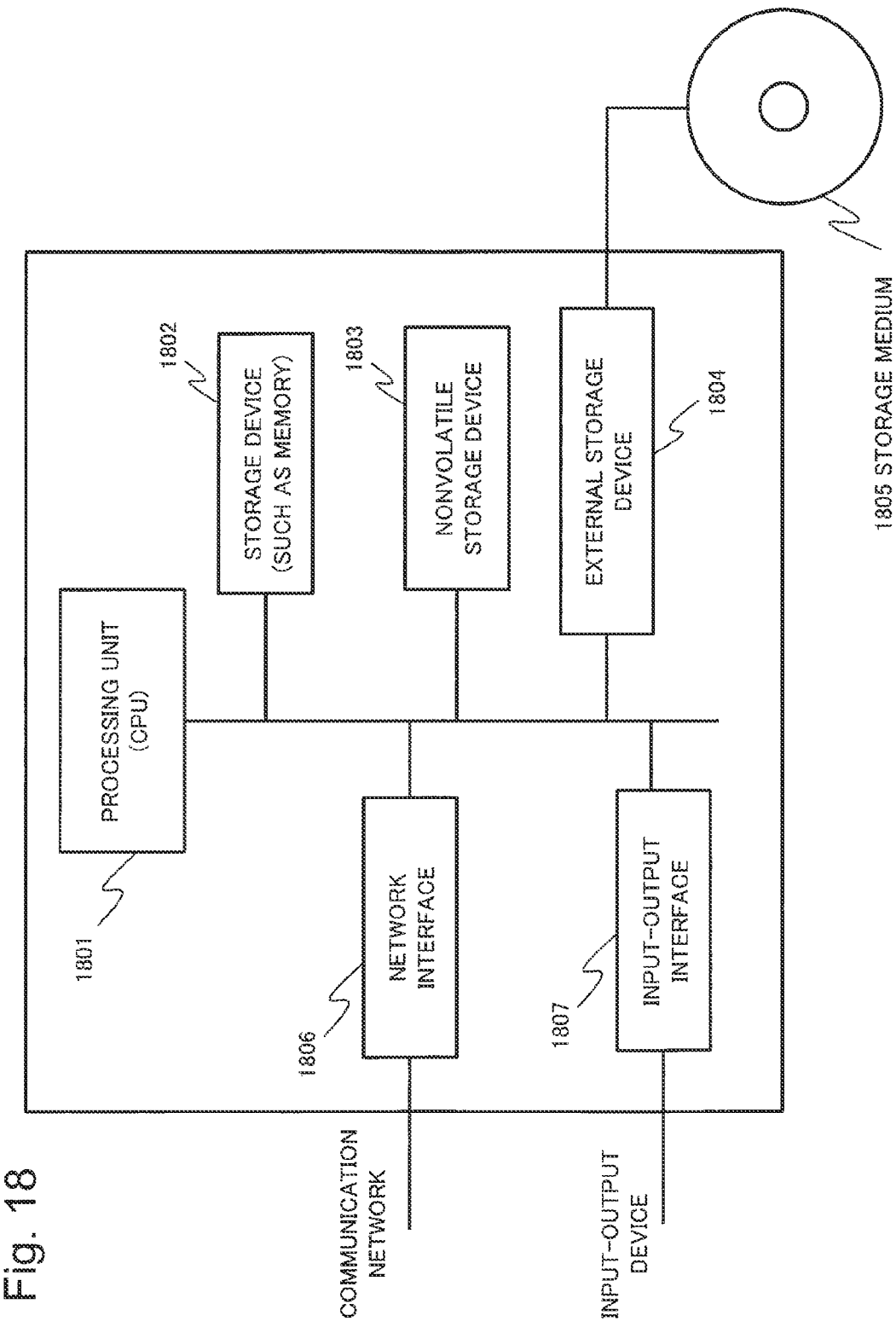
FIG. 18 is a block diagram illustrating an example of a hardware configuration of an information processing apparatus capable of realizing a color scheme evaluation apparatus, according to each of the exemplary embodiments of the present invention.

Alternatively, the color scheme evaluation apparatus explained above may be constituted by hardware exemplified in FIG. 18 and various kinds of software programs (computer programs) executed by such hardware.

A processing unit 1801 in FIG. 18 is a processing device such as a general-purpose CPU (Central Processing Unit), a micro-processor, and the like. For example, the processing unit 1801 may read various kinds of software programs stored in a nonvolatile storage device 1803 to a memory device 1802, and may execute processing in accordance with the software programs.

The memory device 1802 is a memory such as a RAM (Random Access Memory) and the like that can be referred to by the processing unit 1801, and is configured to store software programs and various kinds of data and the like. The memory device 1802 may be a volatile memory device.

For example, the nonvolatile storage device 1803 is a nonvolatile storage device such as a magnetic disk drive and a semiconductor storage device such as a flash memory. Various kinds of software programs and data and the like may be stored in the nonvolatile storage device 1803.

The network interface 1806 is an interface device connected to a communication network, and, for example, an interface device and the like for wired and wireless LAN (Local Area Network) connection may be adopted. When the input apparatus 102 and the output apparatus 103 are configured as independent information processing units, and any communication network communicatively connects between them and the color scheme evaluation apparatus, the color scheme evaluation apparatus may be connected to the communication network via the network interface 1806.

For example, the external storage device 1804 is an apparatus for processing reading and writing of data to and from a medium 1805 explained later.

The storage medium 1805 is, for example, any storage medium capable of recording data such as an optical disk, an optical magnetic disk, a semiconductor flash memory, and the like.

An input-output interface 1807 is an apparatus for controlling input and output between an external input apparatus (for example, a keyboard, a mouse, and the like) and an external output apparatus (for example, a display apparatus, a printer, and the like). In a case where the input apparatus 102 and the output apparatus 103 are configured as peripheral devices for the color scheme evaluation apparatus, the color scheme evaluation apparatus may be connected to these apparatuses via the input-output interface 1807 so as to be able to communicate therewith.

For example, the present invention that has been explained using each of the exemplary embodiments explained above as an example may be implemented as follows. More specifically, the color scheme evaluation apparatus is constituted by hardware as illustrated in FIG. 18 for example, and software programs capable of realizing the functions of the flowchart that is referred to in description of each of the exemplary embodiments are provided to the apparatuses. Thereafter, the present invention may be achieved by causing the processing unit 1801 to execute the software programs.

In each of the exemplary embodiments explained above, each unit as illustrated in FIG. 1, FIG. 8, FIG. 14, FIG. 17 can be realized as a software module that is a unit of function (processing) of the software program executed by the hardware. However, the division of each software module as illustrated in these drawings is made for convenience of explanation, and various configurations may be considered in the implementation.

For example, when each unit as illustrated in FIG. 1, FIG. 8, FIG. 14, FIG. 17 is realized as a software module, these software modules may be stored in the nonvolatile storage device 1803. These software modules may be configured to be read to the memory device 1802 when the processing unit 1801 executes each processing.

These software modules may be configured to transmit various kinds of data to each other by using an appropriate method such as a shared memory, an inter-process communication, and the like. With such configuration, these software modules can be communicatively connected with each other.

Further, the software programs may be registered in the storage medium 1805. In that case, in a shipment stage, operation stage, and the like of the communication apparatus and the like, the apparatus according to the present invention may be configured so that the software programs are stored to the nonvolatile storage device 1803 via the external storage device 1804.

With reference to FIG. 1, FIG. 8, FIG. 14, FIG. 17, a case will be considered in which a color scheme evaluation unit (101a, 801a, 1401a, 1701a: which may be hereinafter collectively referred to as a color scheme evaluation unit) is implemented by use of software programs. In this case, as described above, the processing unit 1801 may read the software programs realizing the functions of the color scheme evaluation unit to the memory device 1802, and may perform control so as to execute the software programs.

Assuming a case in which the software programs realizing the functions of the color scheme evaluation unit receives the information about the evaluation target object from the input apparatus 102, and the result of the color scheme evaluation is transmitted to the output apparatus 103. In this case, for example, during executing the software programs, the processing unit 1801 may transmit the data to and receive the data from the communication network, every time various kinds of data is transmitted to and received from the input apparatus 102. In this case, the processing unit 1801 may transmit and receive the data by controlling the network interface 1806, with regard to the communication network.

The color range storage unit (101b, 801b, 1401b, 1701b: which may be hereinafter collectively referred to as a color range storage unit) may also be realized by software programs, as the color scheme evaluation unit. The color range table held in the color range storage unit may be stored to the nonvolatile storage device 1803.

In this case, the color range table may be read to the memory device 1802 so that the processing unit 1801 can refer to the color range table when the software programs realizing the color range storage unit is executed.

The color difference table held by the color difference storage unit (1401d) and the color difference storage unit may also be implemented as the software programs, in accordance with the similar implementation method as the color range storage unit.

In a case where the components of each color scheme evaluation apparatus are realized as the software programs, the evaluation-target-object-information-table, the color range table, the meaning table, and the color difference table can be implemented by using various kinds of data structures. The data structures may be various kinds of data structure capable of realizing a table (table format) such as, for example, a map, a list, or the like.

The software programs achieving the functions of the color scheme evaluation unit may interpret the evaluation-target-object-information-table and the data structure expressing the meaning table, and may generate the evaluation criterion for the evaluation target objects explained in each of the exemplary embodiments.

In the above case, the providing method for providing the software programs to the apparatus may adopt a method to install software programs into the apparatus, by using an appropriate tool, in a manufacturing step before shipment, a maintenance step after shipment, or the like. The providing method for providing the software programs to the apparatus may adopt a method to download the software programs from the outside via a communication network, such as the Internet. More specifically, the providing method for providing the software programs to the apparatus may employ any known procedure (method) in the present day. In such case, it can be understood that the present invention is constituted by a computer-readable storage medium recorded with a code constituting the software programs or codes.

In the above description, an exemplary embodiment to which the present invention is applied has been explained for example. However, the technical scope of the present invention is not limited to the scope descried in each of the exemplary embodiments explained above. It is clear that a person skilled in the art can apply various kinds of changes or improves to such exemplary embodiments. In such case, new exemplary embodiments to which such changes or improves are applied could also be included in the technical scope of the present invention. The exemplary embodiments obtained by combining the exemplary embodiments explained above could also be included in the technical scope of the present invention. Further, this can be clearly understood from the matters described in the claims.

A part or all of the exemplary embodiments explained above and the modifications thereof could also be described as the Supplemental Notes described below. However, the present invention explained in an exemplary manner by using the exemplary embodiments and the modifications thereof is not limited to the following.

(Supplemental Note 1)

A color scheme evaluation apparatus, including:

color range storage means for storing information about a color range applied to an evaluation target object constituting an evaluation target screen; and color scheme evaluation means for creating an evaluation criterion usable for evaluating a color scheme for the evaluation target object, by interpreting a relationship of a group into which the evaluation target object is classified, on the basis of evaluation target object information including information about the color scheme for the evaluation target object and one or more pieces of information about the group into which the evaluation target object is classified in accordance with a particular criterion, and group relationship information including the relationship about the group, and for evaluating the color scheme for the evaluation target object on the basis of the evaluation criterion by referring to the information about the color range.

(Supplemental Note 2)

The color scheme evaluation apparatus according to Supplemental Note 1, wherein the evaluation target object information includes information about a group into which the evaluation target object is classified on the basis of meaning represented by information displayed with the evaluation target object.

(Supplemental Note 3)

The color scheme evaluation apparatus according to Supplemental Note 1 or 2, wherein the evaluation target object information includes information about the group in which the evaluation target object is classified on the basis of a function presented by the evaluation target object on the evaluation target screen.

(Supplemental Note 4)

The color scheme evaluation apparatus according to any one of Supplemental Notes 1 to 3, wherein the color scheme evaluation means evaluates whether a color in a same range or similar color ranges is arranged to the evaluation target object classified into a group of which relationship is close.

(Supplemental Note 5)

The color scheme evaluation apparatus according to any one of Supplemental Notes 1 to 4, wherein the color scheme evaluation means evaluates whether different colors, for each of the groups, are assigned to the evaluation target object being classified into a first group, among one of one or more groups, and to the evaluation target object being classified into a second group, among one of one or more groups, a relationship of the second group being far from the first group.

(Supplemental Note 6)

The color scheme evaluation apparatus according to Supplemental Note 5, wherein when colors in adjacent color ranges are arranged to the evaluation target object classified into the first group and to another evaluation target object classified into the second group, the color scheme evaluation means evaluates whether there is a color difference equal to or larger than a predetermined criterion, between the color arranged to the first group and the color arranged to the second group.

(Supplemental Note 7)

The color scheme evaluation apparatus according to Supplemental Note 5 or claim 6, wherein, for the evaluation target object classified into the particular first group and the evaluation target object classified into the second group, the color scheme evaluation means calculates a first color value according to first calculation processing on the basis of a color arranged to the evaluation target object classified into the first group, and calculates a second color value according to second calculation processing on the basis of a color arranged to the evaluation target object classified into the second group, and evaluates whether a difference between the first color value calculated and the second color value calculated is equal to or larger than a predetermined criterion value or not.

(Supplemental Note 8)

The color scheme evaluation apparatus according to Supplemental Note 7, wherein the predetermined criterion value is a value calculated on the basis of a value obtained by equally dividing a maximum value of a color range arranged to the evaluation target object by a total number of groups, and the color scheme evaluation means calculates the first color value on the basis of a color in a color range in which a largest number of the evaluation target objects, being classified into the first group, are included, among the color schemes arranged to the evaluation target objects, calculates the second color value on the basis of a color in a color range in which a largest number of the evaluation target objects, being classified into the second group, are included, among the color schemes arranged to the evaluation target objects, evaluates whether a difference between the first color value calculated and the second color value calculated is equal to or larger than the predetermined criterion value or not.

(Supplemental Note 9)

A color scheme evaluation method comprising: storing information about a color range applied to an evaluation target object constituting an evaluation target screen creating an evaluation criterion usable for evaluating a color scheme for the evaluation target object, by interpreting a relationship of a group into which the evaluation target object is classified, on the basis of evaluation target object information including information about the color scheme for the evaluation target object and one or more pieces of information about the group into which the evaluation target object is classified in accordance with a particular criterion, and group relationship information including the relationship about the group, and evaluating the color scheme for the evaluation target object on the basis of the evaluation criterion by referring to the information about the color range.

(Supplemental Note 10)

A computer program or a storage medium recorded with the computer program, the computer program causing a computer to execute:

processing for storing information about a color range applied to an evaluation target object constituting an evaluation target screen; and processing for creating an evaluation criterion usable for evaluating a color scheme for the evaluation target object, by interpreting a relationship of a group into which the evaluation target object is classified, on the basis of evaluation target object information including information about the color scheme for the evaluation target object and one or more pieces of information about the group into which the evaluation target object is classified in accordance with a particular criterion, and group relationship information including the relationship about the group, and processing for evaluating the color scheme for the evaluation target object on the basis of the evaluation criterion by referring to the information about the color range.

(Supplemental Note 11)

The color scheme evaluation apparatus according to Supplemental Note 1, wherein the color scheme evaluation means creates the evaluation criterion usable for evaluating a color scheme for the evaluation target object on the basis of the group relationship information.

(Supplemental Note 12)

The color scheme evaluation apparatus according to Supplemental Note 6, further comprising a color difference determination means for determining, with regard to the adjacent color range, whether colors in each color range are distinguishable or not, wherein when colors in the adjacent color range are arranged to the evaluation target object being classified into the first group and the evaluation target object being classified into the second group, the color scheme evaluation means evaluates whether there is a color difference equal to or larger than the predetermined criterion being determined by the color difference determination means, between the color arranged to the first group and the color arranged to the second group.

(Supplemental Note 13)

The color scheme evaluation apparatus according to Supplemental Note 1, wherein the group relationship information includes information with regard to a relationship between a plurality of the evaluation target objects which are classified into the same group.

(Supplemental Note 14)

The color scheme evaluation apparatus according to Supplemental Note 1, wherein the group relationship information includes information with regard to a relationship between a plurality of the evaluation target objects which are classified into a plurality of the different groups.

(Supplemental Note 15)

The color scheme evaluation apparatus according to Supplemental Note 7, wherein the color scheme evaluation means calculates an average value of the color arranged to the evaluation target object, as one of the first calculation processing and the second calculation processing.

(Supplemental Note 16)

The color scheme evaluation apparatus according to Supplemental Note 15, wherein the first color value is an average value of a color arranged to the evaluation target object being classified into the first group.

(Supplemental Note 17)

The color scheme evaluation apparatus according to Supplemental Note 15, wherein the second color value is an average value of a color arranged to the evaluation target object being classified into the second group.

(Supplemental Note 18)

The color scheme evaluation apparatus according to Supplemental Note 7, wherein the color scheme evaluation means calculates median of the color arranged to the evaluation target object, as one of the first calculation processing and the second calculation processing.

(Supplemental Note 19)

The color scheme evaluation apparatus according to Supplemental Note 18, wherein the first color value is median of a color arranged to the evaluation target object being classified into the first group.

(Supplemental Note 20)

The color scheme evaluation apparatus according to Supplemental Note 18, wherein the second color value is median of a color arranged to the evaluation target object being classified into the second group.

(Supplemental Note 21)

The color scheme evaluation apparatus according to Supplemental Note 6, wherein the color scheme evaluation means selects a first evaluation target object, among the evaluation target objects being classified into the first group, to which a color nearest to a boundary of the adjacent color range, and a second evaluation target object, among the evaluation target objects being classified into the second group, to which a color nearest to a boundary of the adjacent color range, and evaluates whether there is a color difference equal to or larger than a predetermined criterion, between the color arranged to the first evaluation target object and the color arranged to the second evaluation target object.

INDUSTRIAL APPLICABILITY

The present invention can be applied to, for example, a support apparatus and an evaluation apparatus of screen designs as a technology for evaluating color schemes of the components constituting a screen presented to a user such as a system screen is applicable or not. For example, when a system screen is designed, the color scheme evaluation apparatus according to the present invention is used, so that the appropriateness of the color schemes for the components on the screen can be evaluated, and the screen design can be supported. The appropriateness of the color schemes for the system screen can be evaluated by using the color scheme evaluation apparatus according to the present invention on the screen constituting the system in operation.

The present invention has been hereinabove explained by using the exemplary embodiments explained above as a model example. However, the present invention is not limited to the exemplary embodiments explained above. More specifically, the present invention can be applied to various modes that could be understood by a person skilled in the art within the scope of the present invention.

This application claims the priority based on Japanese Patent Application No. 2014-067525 filed on Mar. 28, 2014, and the entire disclosure thereof is incorporated herein by reference.

REFERENCE SIGNS LIST 101 color scheme evaluation apparatus
101a color scheme evaluation unit
101b color range storage unit
101c evaluation result providing unit
102 input apparatus
103 output apparatus
201 screen
202 title
203 first background
204 second background
205 button
801 color scheme evaluation apparatus
801a color scheme evaluation unit
801b color range storage unit
801c evaluation result providing unit
801d color difference storage unit
1401 color scheme evaluation apparatus
1401a color scheme evaluation unit
1401b color range storage unit
1401c evaluation result providing unit
1701 color scheme evaluation apparatus
1701a color scheme evaluation unit
1701b color range storage unit 1801 processing unit
1802 memory device
1803 nonvolatile storage device
1804 external storage device
1805 storage medium
1806 network interface
1807 input-output interface

The invention claimed is:

1. A color scheme evaluation apparatus, comprising:
color range storage configured to store information about a color range of a color scheme for an evaluation target object constituting an evaluation target screen; and
a processor configured to:
create an evaluation criterion usable for evaluating a color scheme for the evaluation target object by interpreting a relationship of a group into which the evaluation target object is classified based on evaluation target object information and group relationship information, the evaluation target object information including information about the color scheme for the evaluation target object and one or more pieces of information about the group into which the evaluation target object is classified in accordance with a particular criterion, and the group relationship information including the relationship about the group; and
evaluate the color scheme for the evaluation target object based on the evaluation criterion by referring to the information about the color range;
wherein the processor is further configured to:
evaluate whether different colors, for each of the groups, are assigned to the evaluation target object classified in a first group of one or more groups and a second group of one or more groups, wherein the second group is different from the first group, and
wherein for the evaluation target object classified into the first group and the second group, the processor is configured to:
calculate a first color value according to first calculation processing based on a color arranged to the evaluation target object classified into the first group,
calculate a second color value according to second calculation processing based on a color arranged to the evaluation target object classified into the second group, and
evaluate whether a difference between the first color value and the second color value is equal to or more than a predetermined criterion value,
wherein the predetermined criterion value is a value calculated based on a value obtained by equally dividing a maximum value of a color range arranged to the evaluation target object by a total number of groups; and
wherein the processor is further configured to:
calculate the first color value based on a color in a color range in which a largest number of the evaluation target objects being classified into the first group are included, among the color schemes arranged to the evaluation target objects,
calculate the second color value based on a color in a color range in which a largest number of the evaluation target objects being classified into the second group are included, among the color schemes arranged to the evaluation target objects, and
evaluate whether a difference between the first color value and the second color value is equal to or more than the predetermined criterion value.

2. The color scheme evaluation apparatus according to claim 1, wherein the evaluation target object information includes information about a group into which the evaluation target object is classified based on a meaning represented by information displayed with the evaluation target object.

3. The color scheme evaluation apparatus according to claim 1, wherein the evaluation target object information includes information about the group in which the evaluation target object is classified based on a function presented by the evaluation target object on the evaluation target screen.

4. The color scheme evaluation apparatus according to claim 1, wherein the color scheme evaluation unit evaluates whether a color in a same range or similar color ranges is arranged to the evaluation target object classified into a group of which there is an increased degree of relation.

5. The color scheme evaluation apparatus according to claim 1, wherein
when colors in adjacent color ranges are arranged to the evaluation target object classified into the first group and to another evaluation target object classified into the second group, the processor is configured to evaluate whether there is a color difference between the color arranged to the first group and the color arranged to the second group that is equal to or more than a predetermined criterion.

6. A color scheme evaluation method comprising:
storing information about a color range applied to an evaluation target object constituting an evaluation target screen;
creating an evaluation criterion usable for evaluating a color scheme for the evaluation target object by interpreting a relationship of a group into which the evaluation target object is classified based on evaluation target object information and group relationship information, the target object information including information about the color scheme for the evaluation target object and one or more pieces of information about the group into which the evaluation target object is classified in accordance with a particular criterion, and the group relationship information including the relationship about the group; and
evaluating the color scheme for the evaluation target object based on the evaluation criterion by referring to the information about the color range;
wherein the method further comprises:
evaluating whether different colors, for each of the groups, are assigned to the evaluation target object classified in a first group of one or more groups and a second group of one or more groups, wherein the second group is different from the first group, and
wherein for the evaluation target object classified into the first group and the second group, the method further comprises:
calculating a first color value according to first calculation processing based on a color arranged to the evaluation target object classified into the first group,
calculating a second color value according to second calculation processing based on a color arranged to the evaluation target object classified into the second group, and
evaluating whether a difference between the first color value and the second color value is equal to or more than a predetermined criterion value,
wherein the predetermined criterion value is a value calculated based on a value obtained by equally dividing a maximum value of a color range arranged to the evaluation target object by a total number of groups; and wherein the method further comprises:

calculating the first color value based on a color in a color range in which a largest number of the evaluation target objects being classified into the first group are included, among the color schemes arranged to the evaluation target objects, calculating the second color value based on a color in a color range in which a largest number of the evaluation target objects being classified into the second group are included, among the color schemes arranged to the evaluation target objects, and evaluating whether a difference between the first color value and the second color value is equal to or more than the predetermined criterion value.

7. A computer-readable non-transitory storage medium recorded with a computer program configured to cause a computer to execute steps comprising:

storing information about a color range applied to an evaluation target object constituting an evaluation target screen;

creating an evaluation criterion usable for evaluating a color scheme for the evaluation target object by interpreting a relationship of a group into which the evaluation target object is classified based on evaluation target object information and group relationship information, the evaluation target object information including information about the color scheme for the evaluation target object and one or more pieces of information about the group into which the evaluation target object is classified in accordance with a particular criterion, and the group relationship information including the relationship about the group; and evaluating the color scheme for the evaluation target object on the basis of the evaluation criterion by referring to the information about the color range;

wherein the steps further comprise:

evaluating whether different colors, for each of the groups, are assigned to the evaluation target object classified in a first group of one or more groups and a second group of one or more groups, wherein the second group is different from the first group, and wherein for the evaluation target object classified into the first group and the second group, the steps further comprise:

calculating a first color value according to first calculation processing based on a color arranged to the evaluation target object classified into the first group, calculating a second color value according to second calculation processing based on a color arranged to the evaluation target object classified into the second group, and evaluating whether a difference between the first color value and the second color value is equal to or more than a predetermined criterion value, wherein the predetermined criterion value is a value calculated based on a value obtained by equally dividing a maximum value of a color range arranged to the evaluation target object by a total number of groups; and wherein the steps further comprise:

calculating the first color value based on a color in a color range in which a largest number of the evaluation target objects being classified into the first group are included, among the color schemes arranged to the evaluation target objects, calculating the second color value based on a color in a color range in which a largest number of the evaluation target objects being classified into the second group are included, among the color schemes arranged to the evaluation target objects, and evaluating whether a difference between the first color value and the second color value is equal to or more than the predetermined criterion value.

* * * * *